(12) United States Patent
Araki et al.

(10) Patent No.: US 11,514,931 B1
(45) Date of Patent: Nov. 29, 2022

(54) MAGNETIC HEAD INCLUDING MAIN POLE HAVING TOP SURFACE INCLUDING FIRST INCLINED PORTION, SECOND INCLINED PORTION, AND THIRD INCLINED PORTION, AND SPIN TORQUE OSCILLATOR

(71) Applicants: Hironori Araki, Milpitas, CA (US); Yoshitaka Sasaki, Los Gatos, CA (US); Tetsuhito Shinohara, Milpitas, CA (US); Shigeki Tanemura, Milpitas, CA (US); Kazuki Sato, Milpitas, CA (US); Yoji Nomura, Milpitas, CA (US); Yukinori Ikegawa, Milpitas, CA (US); Tetsuya Roppongi, Milpitas, CA (US)

(72) Inventors: Hironori Araki, Milpitas, CA (US); Yoshitaka Sasaki, Los Gatos, CA (US); Tetsuhito Shinohara, Milpitas, CA (US); Shigeki Tanemura, Milpitas, CA (US); Kazuki Sato, Milpitas, CA (US); Yoji Nomura, Milpitas, CA (US); Yukinori Ikegawa, Milpitas, CA (US); Tetsuya Roppongi, Milpitas, CA (US)

(73) Assignee: HEADWAY TECHNOLOGIES, INC., Milpitas, CA (US)

(*) Notice: Subject to any disclaimer, the term of this patent is extended or adjusted under 35 U.S.C. 154(b) by 0 days.

(21) Appl. No.: 17/677,326

(22) Filed: Feb. 22, 2022

(51) Int. Cl.
*G11B 5/31* (2006.01)
*G11B 5/127* (2006.01)
*G11B 5/39* (2006.01)
*G11B 5/235* (2006.01)
*G11B 5/00* (2006.01)

(52) U.S. Cl.
CPC .......... *G11B 5/3116* (2013.01); *G11B 5/1278* (2013.01); *G11B 5/314* (2013.01); *G11B 5/235* (2013.01); *G11B 5/3146* (2013.01); *G11B 5/3912* (2013.01); *G11B 2005/0024* (2013.01)

(58) Field of Classification Search
None
See application file for complete search history.

(56) References Cited

U.S. PATENT DOCUMENTS

| | | |
|---|---|---|
| 8,320,079 B2 | 11/2012 | Iwasaki et al. |
| 8,917,481 B2 | 12/2014 | Kusukawa et al. |
| 9,478,242 B1 * | 10/2016 | Liu et al. ............... G11B 5/3116 |
| 10,032,470 B1 | 7/2018 | Degawa et al. |
| 10,109,302 B1 | 10/2018 | Shinohara et al. |
| 10,839,829 B1 | 11/2020 | Sasaki et al. |
| 11,211,082 B1 | 12/2021 | Sasaki et al. |
| 2018/0075868 A1 | 3/2018 | Koui et al. |

* cited by examiner

*Primary Examiner* — Craig A. Renner
(74) *Attorney, Agent, or Firm* — Oliff PLC

(57) ABSTRACT

A magnetic head includes a main pole, a trailing shield, and a spin torque oscillator. A top surface of the main pole includes a first inclined portion, a second inclined portion, and a third inclined portion arranged in order of closeness to a medium facing surface. Each of the first to third inclined portions has a front end closest to the medium facing surface and a rear end farthest from the medium facing surface. Each of the first to third inclined portions is inclined relative to the medium facing surface and a direction orthogonal to the medium facing surface so that its rear end is located forward relative to its front end in a direction of travel of a recording medium.

10 Claims, 17 Drawing Sheets

MAGNETIC HEAD INCLUDING MAIN POLE HAVING TOP SURFACE INCLUDING FIRST INCLINED PORTION, SECOND INCLINED PORTION, AND THIRD INCLINED PORTION, AND SPIN TORQUE OSCILLATOR

BACKGROUND OF THE INVENTION

1. Field of the Invention

The present invention relates to a magnetic head including a spin torque oscillator.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is less likely to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a magnetic path forming section. The coil generates a magnetic field corresponding to data to be written on the recording medium. The magnetic path forming section is made of a magnetic material and forms a magnetic path for passing a magnetic flux corresponding to the magnetic field generated by the coil.

The magnetic path forming section includes, for example, a main pole, a trailing shield, and a return path section. The main pole has a first end face located in a medium facing surface configured to face a recording medium. The trailing shield has a second end face located in the medium facing surface at a position forward relative to the first end face in a direction of travel of the recording medium. The return path section magnetically connects part of the main pole away from the medium facing surface to the trailing shield. The main pole generates, from the first end face, a write magnetic field for writing data on the recording medium.

Recently, the use of what is called a spin torque oscillator in a magnetic head has been proposed as a method for increasing the recording density of a magnetic disk drive. U.S. Pat. Nos. 8,320,079 B2, 8,917,481 B2, 10,032,470 B1 and 10,109,302 B1 each disclose a technology of using a spin torque oscillator that generates a microwave magnetic field. According to the technology, a microwave magnetic field is generated by the spin torque oscillator, and the microwave magnetic field and the write magnetic field are simultaneously applied to a portion of the recording medium on which data is to be written. To increase the recording density, it is effective to increase the coercivity of the recording medium by making magnetic fine particles of the recording medium smaller and, at the same time, enhancing the anisotropic energy of the magnetic fine particles. The aforementioned technology enables data writing with the coercivity of the recording medium lowered by microwaves, thus enabling use of a recording medium having high coercivity as mentioned above.

U.S. Patent Application Publication No. 2018/0075868 A1 discloses a technology of using a spin torque oscillator that adjusts magnetic permeability. The spin torque oscillator blocks magnetic flux leaking from the main pole to the trailing shield. The technology makes it possible to make a gap between the main pole and the shield smaller. This in turn makes it possible to steepen the gradient of change in the strength of the write magnetic field to thereby increase the recording density.

In both of the above-described two technologies, the spin torque oscillator is disposed between the main pole and the trailing shield and electrically connected to the main pole and the trailing shield.

A method of forming a spin torque oscillator will now be discussed. Typically, a spin torque oscillator is formed as follows. A layered film to later become the spin torque oscillator is initially formed on the top surface of the main pole, and then the layered film is patterned by etching so that a plurality of surfaces of the spin torque oscillator other than the top and bottom surfaces are formed in the layered film. With the layered film etched, the length of the top surface of the resulting spin torque oscillator in the direction perpendicular to the medium facing surface is typically smaller than that of the bottom surface of the spin torque oscillator in the direction perpendicular to the medium facing surface. To avoid this, the layered film needs to be over-etched up to the main pole. This, however, reduces the cross-sectional area of the main pole near the medium facing surface, and causes a problem of degradation in recording characteristics such as an overwrite characteristic.

SUMMARY OF THE INVENTION

An object of the present invention is to provide a magnetic head including a spin torque oscillator, wherein the cross-sectional area of the main pole near the medium facing surface can be increased.

A magnetic head according to the present invention includes: a medium facing surface configured to face a recording medium; a main pole configured to generate a write magnetic field for writing data on the recording medium; a trailing shield formed of a magnetic material and located forward relative to the main pole in a direction of travel of the recording medium; and a spin torque oscillator located between the main pole and the trailing shield, and electrically connected to the main pole and the trailing shield.

The main pole has a top surface facing the trailing shield. The top surface of the main pole includes a first inclined portion, a second inclined portion, and a third inclined portion arranged in order of closeness to the medium facing surface. Each of the first to third inclined portions has a front end closest to the medium facing surface and a rear end farthest from the medium facing surface, and is inclined relative to the medium facing surface and a direction perpendicular to the medium facing surface so that the rear end is located forward relative to the front end in the direction of travel of the recording medium.

In the magnetic head according to the present invention, a total length of the second and third inclined portions in the direction perpendicular to the medium facing surface may be greater than or equal to a length of the first inclined portion in the direction perpendicular to the medium facing surface.

In the magnetic head according to the present invention, a distance from the medium facing surface to the rear end of the first inclined portion may be in a range of 10 to 25 nm.

In the magnetic head according to the present invention, a distance from the medium facing surface to the rear end of the second inclined portion may be in a range of 25 to 35 nm.

In the magnetic head according to the present invention, a distance from the medium facing surface to the rear end of the third inclined portion may be in a range of 40 to 60 nm.

In the magnetic head according to the present invention, a distance from the rear end of the second inclined portion to a first imaginary plane may be in a range of 10 to 25 nm. The first imaginary plane may be a plane including the first inclined portion.

In the magnetic head according to the present invention, a distance from the rear end of the third inclined portion to a second imaginary plane may be in a range of 10 to 35 nm. The second imaginary plane may be a plane that passes through the rear end of the second inclined portion and is parallel to the first inclined portion.

In the magnetic head according to the present invention, an angle that the second inclined portion forms with a direction parallel to the medium facing surface may be greater than an angle that the first inclined portion forms with the direction parallel to the medium facing surface. An angle that the third inclined portion forms with the direction parallel to the medium facing surface may be greater than the angle that the second inclined portion forms with the direction parallel to the medium facing surface.

In the magnetic head according to the present invention, the top surface of the main pole may further include a fourth inclined portion which is connected to the rear end of the third inclined portion and inclined relative to the medium facing surface and the direction perpendicular to the medium facing surface.

In the magnetic head according to the present invention, an angle that the fourth inclined portion forms with the direction parallel to the medium facing surface may be smaller than the angle that the third inclined portion forms with the direction parallel to the medium facing surface.

The magnetic head according to the present invention may further include a nonmagnetic layer located on the fourth inclined portion. The spin torque oscillator may be located on the first to third inclined portions and the nonmagnetic layer.

In the magnetic head according to the present invention, the top surface of the main pole includes the first to third inclined portions. Each of the first to third inclined portions is inclined so that its rear end is located forward relative to its front end in the direction of travel of the recording medium. According to the present invention, the cross-sectional area of the main pole near the medium facing surface can thereby be increased.

Other objects, features and advantages of the present invention will become fully apparent from the following description.

DETAILED DESCRIPTION OF THE PREFERRED EMBODIMENTS

Figure 1:
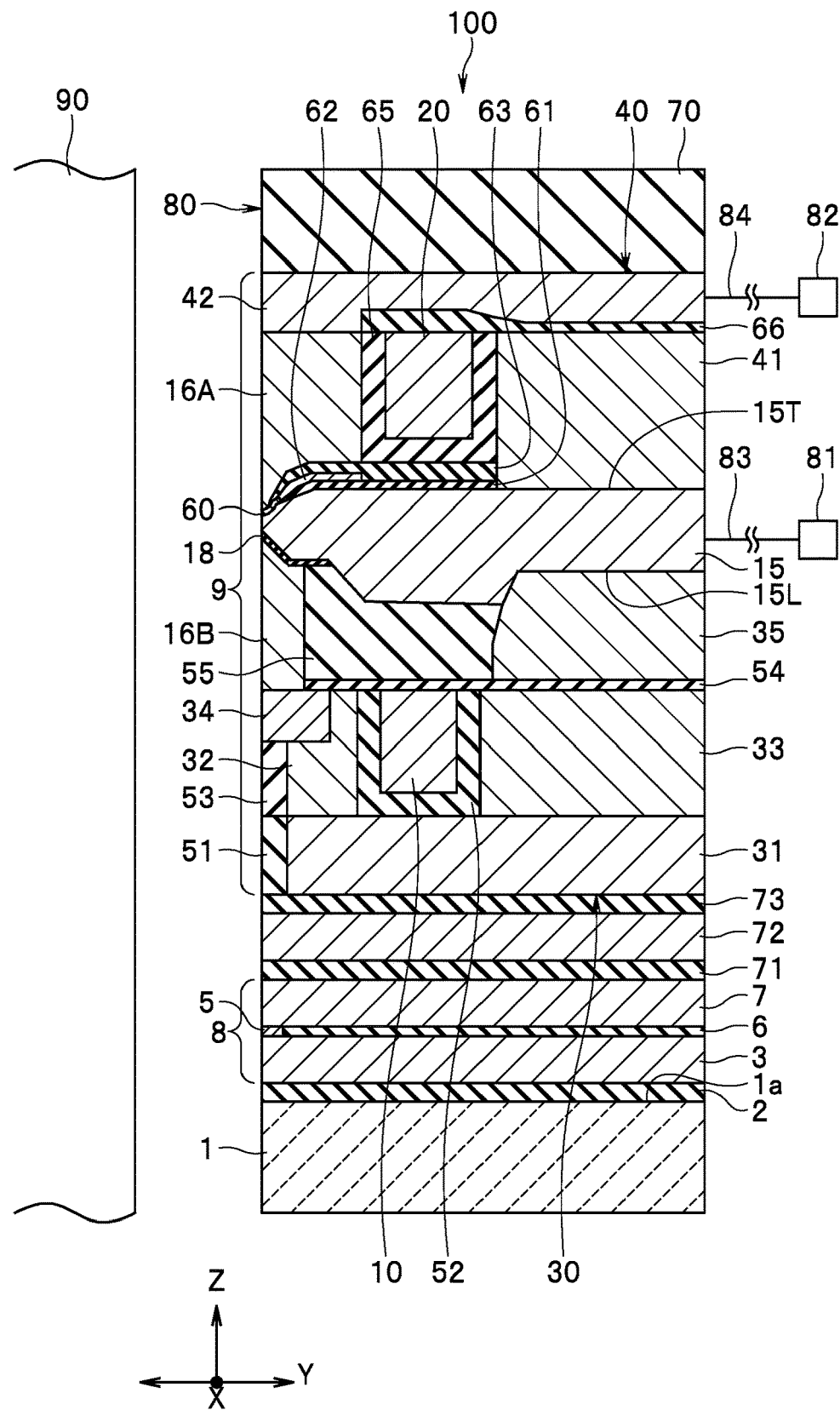
FIG. 1 is a cross-sectional view showing a configuration of a magnetic head according to an embodiment of the invention.
Figure 2:
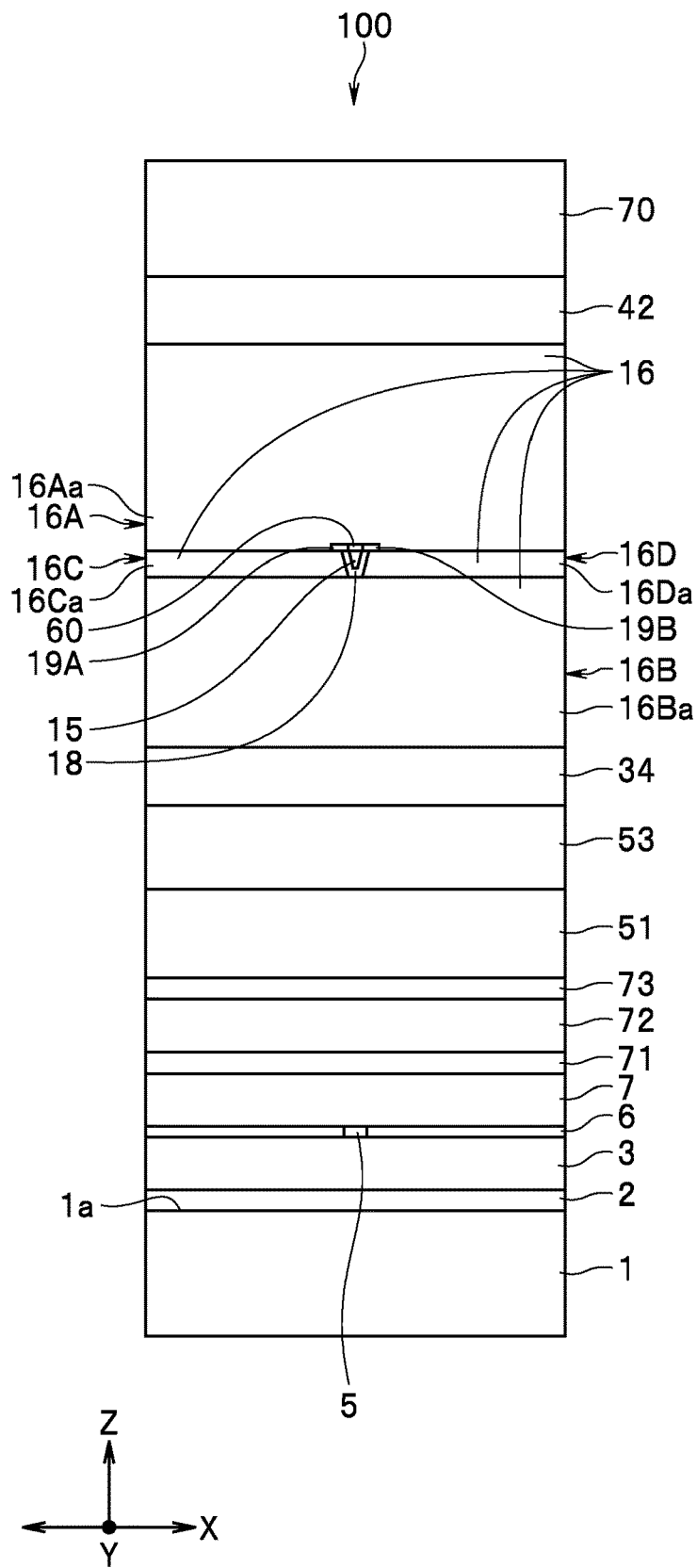
FIG. 2 is a front view showing a medium facing surface of the magnetic head according to the embodiment of the invention.
Figure 3:
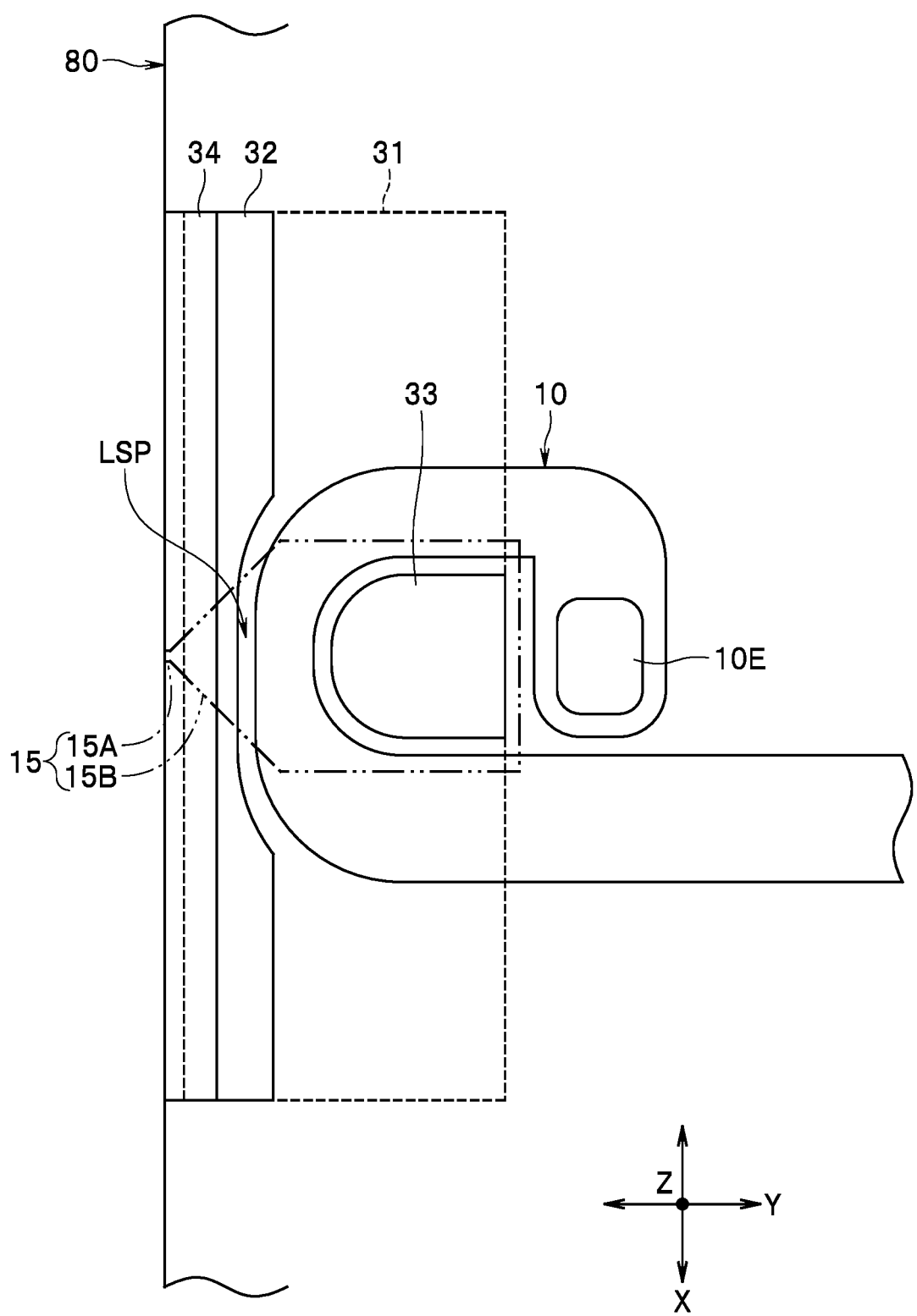
FIG. 3 is a plan view showing a lower coil portion of the magnetic head according to the embodiment of the invention.
Figure 4:
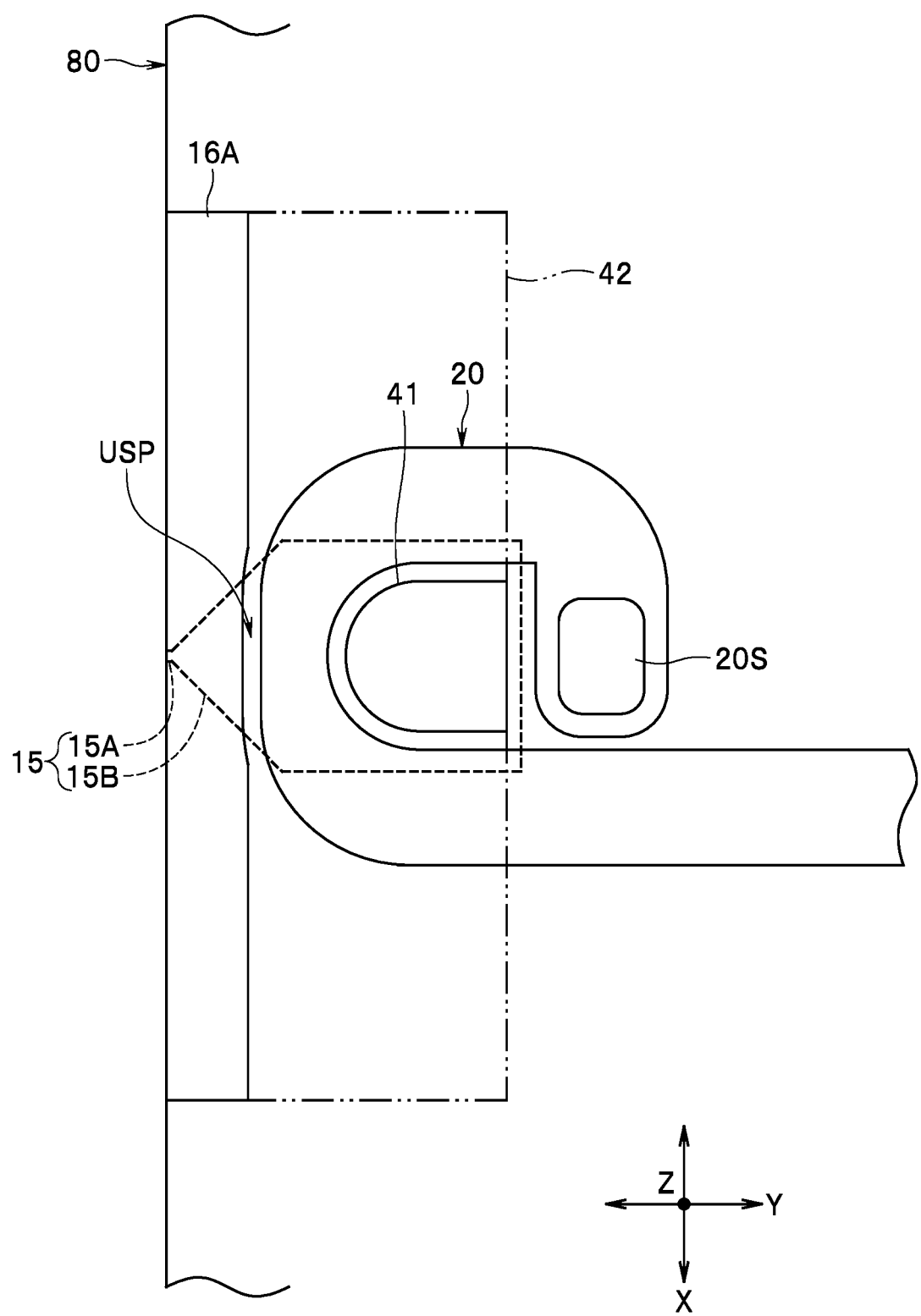
FIG. 4 is a plan view showing an upper coil portion of the magnetic head according to the embodiment of the invention.

An embodiment of the present invention will now be described in detail with reference to the drawings. First, reference is made to FIG. 1 to FIG. 4 to describe a configuration of a magnetic head according to a first embodiment of the invention. FIG. 1 is a cross-sectional view showing a configuration of the magnetic head. FIG. 2 is a front view showing a medium facing surface of the magnetic head. FIG. 3 is a plan view showing a lower coil portion of the magnetic head. FIG. 4 is a plan view showing an upper coil portion of the magnetic head.

The magnetic head 100 according to the present embodiment is one intended for perpendicular magnetic recording. The magnetic head 100 according to the present embodiment is for use with, e.g., a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 1, the magnetic head 100 has the aforementioned medium facing surface 80. Further, as shown in FIGS. 1 and 2, the magnetic head 100 includes: a substrate 1 formed of a ceramic material such as aluminum oxide-titanium carbide ($Al_2O_3$-TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element.

The parts from the first read shield layer 3 to the second read shield layer 7 constitute a read head unit 8. The magnetic head 100 further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has a function of shielding the MR element 5 from magnetic fields generated in the write head unit 9. The nonmagnetic layers 71 and 73 are formed of alumina, for example.

The write head unit 9 includes a coil, a main pole 15, and a write shield 16. The coil is configured to produce a magnetic field corresponding to data to be written on the recording medium 90. The coil includes an upper coil portion 20 and a lower coil portion 10. The upper coil portion 20 and the lower coil portion 10 are both formed of a conductive material such as copper. The upper coil portion 20 and the lower coil portion 10 are connected in series or in parallel. The main pole 15 has an end face 15a located in the medium facing surface 80. The main pole 15 is configured to pass a magnetic flux corresponding to the magnetic field generated by the coil, and to produce a write magnetic field for writing data on the recording medium 90 by means of a perpendicular magnetic recording system. FIG. 1 shows a cross section that intersects the end face 15a of the main pole 15 and that is perpendicular to the medium facing surface 80 and to the top surface 1a of the substrate 1.

As shown in FIG. 2, the write shield 16 includes a trailing shield 16A, a leading shield 16B, a first side shield 16C, and a second side shield 16D. The trailing shield 16A is located forward relative to the main pole 15 in the direction of travel of the recording medium 90 (the Z direction). Being located forward relative to the main pole 15 in the direction of travel of the recording medium 90 refers to being located farther from the top surface 1a of the substrate 1 than the main pole 15. The leading shield 16B is located backward relative to the main pole 15 in the direction of travel of the recording medium 90. Being located backward relative to the main pole 15 in the direction of travel of the recording medium 90 refers to being located closer to the top surface 1a of the substrate 1 than the main pole 15. The first and second side shields 16C and 16D are located farther from the top surface 1a of the substrate 1 than the leading shield 16B, opposed to each other in the track width direction (the X direction) with the main pole 15 therebetween, and magnetically couple the trailing shield 16A and the leading shield 16B.

As shown in FIG. 2, the trailing shield 16A has a front end face 16Aa located in the medium facing surface 80. The leading shield 16B has a front end face 16Ba located in the medium facing surface 80. The first side shield 16C has a front end face 16Ca located in the medium facing surface 80. The second side shield 16D has a front end face 16Da located in the medium facing surface 80.

The front end face 16Aa is located forward relative to the end face 15a of the main pole 15 in the direction of travel of the recording medium 90. The front end face 16Ba is located backward relative to the end face 15a of the main pole 15 in the direction of travel of the recording medium 90. The front end faces 16Ca and 16Da are located on opposite sides of the end face 15a of the main pole 15 in the track width direction. In the medium facing surface 80, the front end faces 16Aa, 16Ba, 16Ca, and 16Da are arranged to surround the end face 15a of the main pole 15.

The write shield 16 is formed of a magnetic material. For example, CoFeN, CoNiFe, FeNi, or CoFe may be used as the material of the write shield 16.

The write head unit 9 further includes a spin torque oscillator 60. The spin torque oscillator 60 is located between the main pole 15 and the trailing shield 16A in the vicinity of the medium facing surface 80 and electrically connected to the main pole 15 and the trailing shield 16A. The spin torque oscillator 60 may be an element configured to generate a microwave magnetic field or an element configured to adjust a magnetic permeability between the main pole 15 and the trailing shield 16A. The configuration of the spin torque oscillator 60 will be described in detail later.

The write head unit 9 further includes an upper return path section 40 and a lower return path section 30. Both the upper return path section 40 and the lower return path section 30 are formed of a magnetic material. For example, CoFeN, CoNiFe, FeNi, or CoFe may be used as the material of the upper return path section 40 and the lower return path section 30.

The upper return path section 40 is located forward relative to the main pole 15 in the direction of travel of the recording medium 90, and connects part of the main pole 15 located away from the medium facing surface 80 to the write shield 16, thereby magnetically coupling the main pole 15 to the write shield 16. The upper return path section 40 and the main pole 15 define an upper space USP (see FIG. 4) for a portion of the coil to pass through.

The lower return path section 30 is located backward relative to the main pole 15 in the direction of travel of the recording medium 90, and connects part of the main pole 15 located away from the medium facing surface 80 to the write shield 16, thereby magnetically coupling the main pole 15 to the write shield 16. The lower return path section 30 and the main pole 15 define a lower space LSP (see FIG. 3) for a portion of the coil to pass through.

The lower return path section 30 includes coupling portions 31, 32, 33, 34, and 35. The coupling portion 31 is disposed on the nonmagnetic layer 73. The coupling portions 32 and 33 are both disposed on the coupling portion 31. The coupling portion 32 is located near the medium facing surface 80. The coupling portion 33 is located farther from the medium facing surface 80 than the coupling portion 32. The coupling portions 31 and 32 have their respective end faces that face toward the medium facing surface 80 and that are each located at a distance from the medium facing surface 80.

As shown in FIG. 3, the lower coil portion 10 is wound around the coupling portion 33. The write head unit 9 further includes: an insulating layer 51 formed of an insulating material, disposed on the nonmagnetic layer 73, and surrounding the coupling portion 31; an insulating film 52 formed of an insulating material and isolating the lower coil portion 10 from the coupling portions 31 to 33; and an insulating layer 53 formed of an insulating material and disposed around the lower coil portion 10 and the coupling portion 32. The coupling portion 34 is embedded in the coupling portion 32 and the insulating layer 53. The coupling portion 34 has an end face located in the medium facing surface 80. The top surfaces of the lower coil portion 10, the coupling portions 32 to 34, the insulating film 52, and the insulating layer 53 are even with each other. The insulating layers 51 and 53 and the insulating film 52 are formed of alumina, for example.

The leading shield 16B lies on a part of the top surface of the coupling portion 34. The write head unit 9 further includes an insulating layer 54 formed of an insulating material. The insulating layer 54 lies on another part of the top surface of the coupling portion 34 and on the top surfaces of the lower coil portion 10, the coupling portions 32 and 33, the insulating film 52, and the insulating layer 53. The coupling portion 35 lies over the coupling portion 33 with the insulating layer 53 interposed therebetween. Note that the coupling portions 33 and 35 magnetically couple to each other even with the insulating layer 54 interposed between the coupling portions 33 and 35. The insulating layer 54 is formed of alumina, for example.

The write head unit 9 further includes a nonmagnetic layer 55 formed of a nonmagnetic material. The nonmagnetic layer 55 lies on the insulating layer 54 and surrounds the leading shield 16B and the coupling portion 35. The nonmagnetic layer 55 is formed of alumina or silicon oxide ($SiO_2$), for example.

The first and second side shields 16C and 16D are disposed on the leading shield 16B. The main pole 15 has the end face 15a, and also a top surface 15T (see FIG. 1) farthest from the top surface 1a of the substrate 1, a bottom end 15L (see FIG. 1) opposite to the top surface 15T, and a first side surface and a second side surface (see FIGS. 2 to 4) opposite to each other in the track width direction (the X direction). As shown in FIG. 2, the first side shield 16C has a first sidewall opposed to a portion of the first side surface of the main pole 15, the portion being located near the medium facing surface 80. The second side shield 16D has a second sidewall opposed to a portion of the second side surface of the main pole 15, the portion being located near the medium facing surface 80.

The write head unit 9 further includes a first gap layer 18 formed of a nonmagnetic material. The first gap layer 18 is disposed to extend along the first and second sidewalls of the first and second side shields 16C and 16D, the top surface of the leading shield 16B, and the top surface of the nonmagnetic layer 55. An example of the nonmagnetic material used to form the first gap layer 18 is an insulating material such as alumina.

As shown in FIG. 1, the first gap layer 18 is interposed between a portion of the bottom end 15L of the main pole 15 and the top surfaces of the leading shield 16B and the nonmagnetic layer 55. As shown in FIG. 2, the first gap layer 18 is interposed also between the first side surface of the main pole 15 and the first sidewall of the first side shield 16C, and between the second side surface of the main pole 15 and the second sidewall of the second side shield 16D.

At a location apart from the medium facing surface 80, the bottom end 15L of the main pole 15 is in contact with the top surface of the coupling portion 35. The main pole 15 is formed of a ferromagnetic material containing one or more elements selected from Ni, Fe, and Co, such as FeNi, CoNiFe, or CoFe. The shape of the main pole 15 will be described in detail later.

The write head unit 9 further includes a first nonmagnetic layer (not shown) formed of a nonmagnetic material and disposed around the main pole 15 and the first and second side shields 16C and 16D. An example of the nonmagnetic material used to form the first nonmagnetic layer is an insulating material such as alumina.

The write head unit 9 further includes a nonmagnetic layer 61. The nonmagnetic layer 61 is formed of a nonmagnetic material and disposed on a first portion of the top surface 15T of the main pole 15 away from the medium facing surface 80. An example of the nonmagnetic material used to form the nonmagnetic layer 61 is an insulating material such as alumina.

Figure 5:
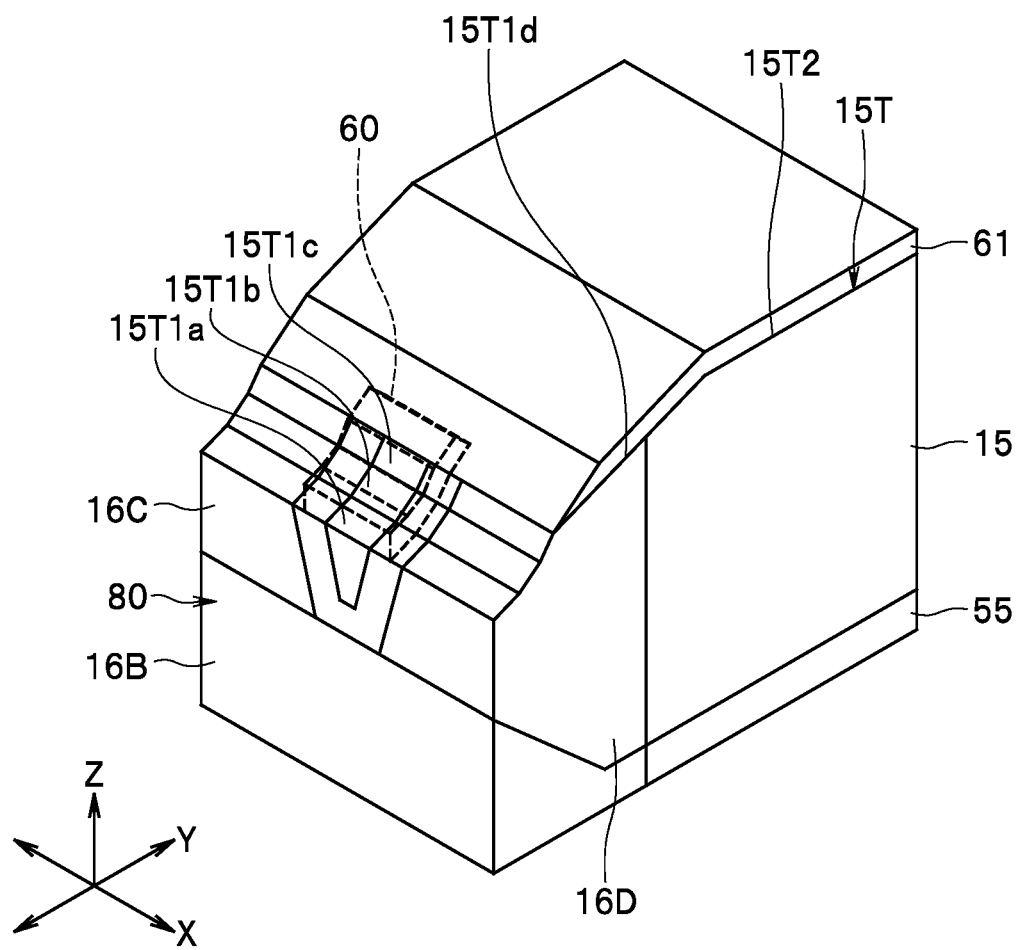
FIG. 5 is a perspective view showing essential parts of the magnetic head according to the embodiment of the invention.
Figure 6:
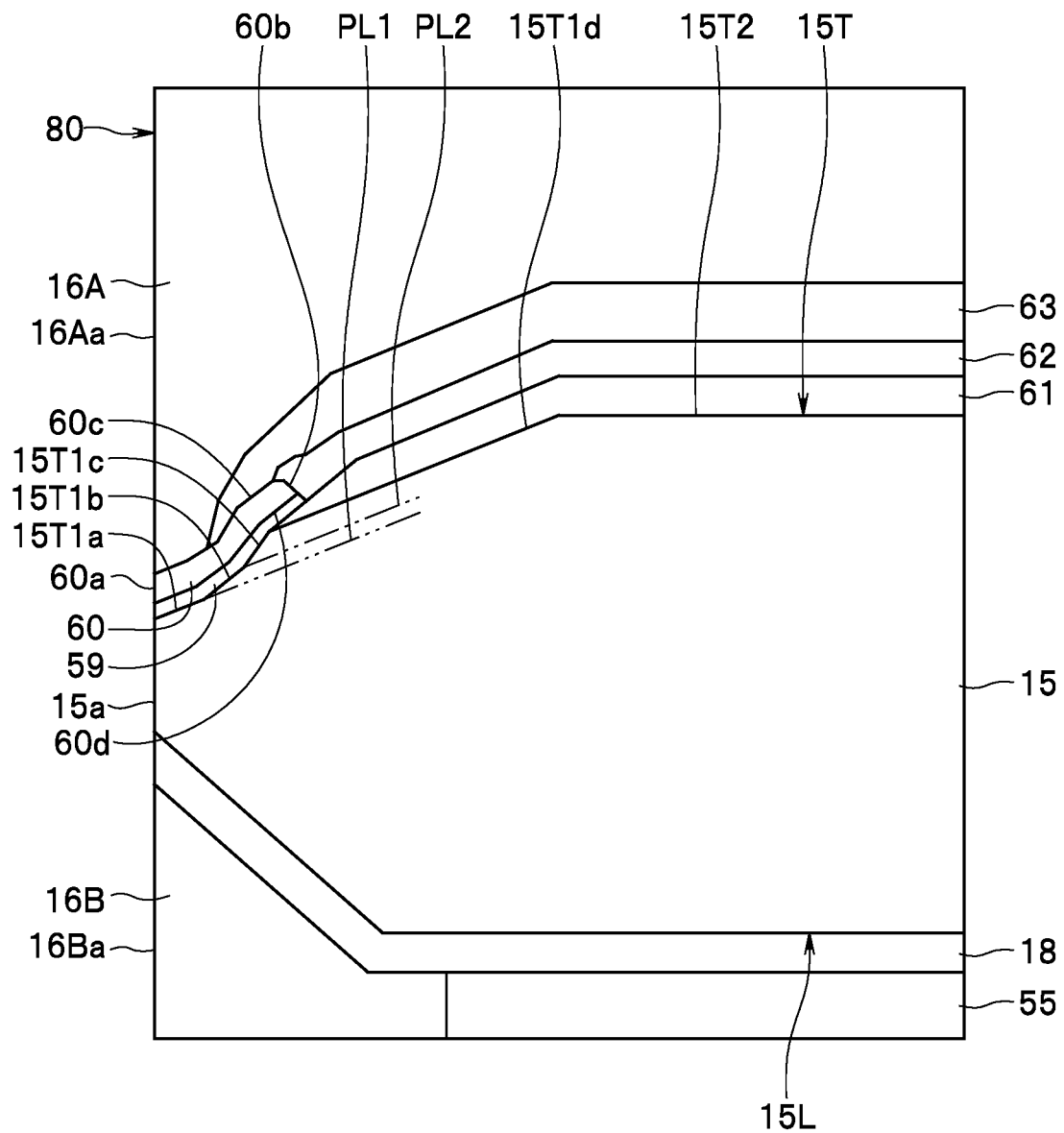
FIG. 6 is a cross-sectional view showing the essential parts of the magnetic head according to the embodiment of the invention.

The write head unit 9 further includes a buffer layer 59 formed of a nonmagnetic conductive material. Note that the buffer layer 59 is shown in FIGS. 5 and 6 to be described later. The buffer layer 59 is disposed on the main pole 15 and the nonmagnetic layer 61 near the medium facing surface 80, and in contact with the top surface 15T of the main pole 15. The spin torque oscillator 60 lies on the buffer layer 59. The buffer layer 59 is formed of, for example, one of Ta, Al, Ti, Mn, Ni, Zn, Zr, Nb, Mo, Ru, Rh, Pd, Ag, Hf, W, Ir, Pt, and Au, or an alloy composed of two or more of these elements.

The write head unit 9 further includes a heat sink 62 and an insulating layer 63. The heat sink 62 is located on the nonmagnetic layer 61 at a position farther from the medium facing surface 80 than are the buffer layer 59 and the spin torque oscillator 60. The insulating layer 63 is formed of an insulating material located to cover a part of the spin torque oscillator 60 and the heat sink 62. The heat sink 62 is formed of a nonmagnetic metal material. Specifically, the heat sink 62 is formed of one of Ru, Cr, Ta, W. Mo, Al, Pt, Rh, Ir, Au, Ag, and Cu, or an alloy composed of two or more of these elements, for example. The insulating layer 63 is formed of alumina, for example The write head unit 9 further includes a second gap layer 19 formed of a nonmagnetic material. As shown in FIG. 2, the second gap layer 19 includes a first portion 19A and a second portion 19B located on opposite sides of the buffer layer 59 and the spin torque oscillator 60 in the track width direction (the X direction). The first portion 19A lies on the first side shield 16C and the first gap layer 18. The second portion 19B lies on the second side shield 16D and the first gap layer 18. An example of the nonmagnetic material used to form the second gap layer 19 is an insulating material such as alumina.

The trailing shield 16A is disposed on the first and second side shields 16C and 16D, the second gap layer 19, the spin torque oscillator 60, and the insulating layer 63, and in contact with the top surfaces of the first and second side shields 16C and 16D, the second gap layer 19, the spin torque oscillator 60, and the insulating layer 63. In the medium facing surface 80, a portion of the front end face 16Aa of the trailing shield 16A is spaced a predetermined distance away from the end face 15a of the main pole 15.

The predetermined distance is preferably in the range of 5 to 60 nm, and may be 30 to 60 nm, for example.

The upper return path section 40 includes coupling portions 41 and 42. The coupling portion 41 lies on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15.

As shown in FIG. 4, the upper coil portion 20 is wound around the coupling portion 41. The write head unit 9 further includes: an insulating film 65 formed of an insulating material and isolating at least part of the upper coil portion 20 from the trailing shield 16A, the coupling portion 41 and the insulating layer 63; and a second nonmagnetic layer (not shown) formed of a nonmagnetic material and disposed around the trailing shield 16A, the upper coil portion 20, and the coupling portion 42. The insulating film 65 is formed of alumina, for example. An example of the nonmagnetic material used to form the second nonmagnetic layer is an insulating material such as alumina.

The write head unit 9 further includes an insulating layer 66 formed of an insulating material and disposed on the upper coil portion 20, the coupling portion 41, and the insulating film 65. The insulating layer 66 includes a first portion lying on the upper coil portion 20 and a second portion lying on the coupling portion 41. The second portion is smaller in maximum thickness (maximum dimension in the Z direction) than the first portion. The insulating layer 66 is formed of alumina, for example.

The coupling portion 42 is disposed on the trailing shield 16A and the insulating layer 66. The coupling portion 42 has an end face located in the medium facing surface 80. The coupling portion 42 includes a first portion lying on the trailing shield 16A, a second portion lying over the coupling portion 41 with the insulating layer 66 interposed therebetween, and a third potion connecting the first and second portions. Note that the coupling portions 41 and 42 magnetically couple to each other even with the insulating layer 66 interposed between the coupling portion 41 and the second portion of the coupling portion 42.

The magnetic head 100 further includes a protective layer 70 formed of a nonmagnetic material and disposed to cover the write head unit 9. The protective layer 70 is formed of, e.g., an inorganic insulating material such as alumina.

As has been described, the magnetic head 100 according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 15, the write shield 16, the first gap layer 18, the second gap layer 19, the buffer layer 59, the spin torque oscillator 60, and the nonmagnetic layer 61. The coil, the main pole 15, the write shield 16, the first gap layer 18, the second gap layer 19, the buffer layer 59, and the spin torque oscillator 60 are disposed above the top surface 1a of the substrate 1. The write shield 16 includes the trailing shield 16A, the leading shield 16B, and the first and second side shields 16C and 16D.

The write head unit 9 further includes the upper return path section 40 and the lower return path section 30. The upper return path section 40 includes the coupling portions 41 and 42. The lower return path section 30 includes the coupling portions 31, 32, 33, 34. and 35.

The write shield 16 captures a disturbance magnetic field applied to the magnetic head 100 from outside the magnetic head 100. This makes it possible to prevent erroneous writing on the recording medium 90 that would be caused by the disturbance magnetic field being intensively captured into the main pole 15. The write shield 16 further has a function of capturing a magnetic flux that is generated from the end face 15a of the main pole 15 and spreads in directions other than the direction perpendicular to the plane of the recording medium 90, and thereby preventing the magnetic flux from reaching the recording medium 90. Furthermore, the write shield 16, the upper return path section 40, and the lower return path section 30 have a function of causing a magnetic flux that has been generated from the end face 15a of the main pole 15 and has magnetized a portion of the recording medium 90 to flow back.

The spin torque oscillator 60 is electrically connected to the main pole 15 and the trailing shield 16A. In the present embodiment, specifically, the spin torque oscillator 60 is electrically connected to the main pole 15 via the buffer layer 59. As shown in FIG. 1, the magnetic head 100 further includes: two terminals 81 and 82 connected to a power source (not shown); wiring 83 for electrically connecting the terminal 81 and the main pole 15; and wiring 84 for electrically connecting the terminal 82 and the coupling portion 42. The trailing shield 16A is electrically connected to the coupling portion 42. A current for operating the spin torque oscillator 60 (which will hereinafter be referred to as a driving current) is supplied via the terminals 81 and 82. The driving current flows through the main pole 15, the buffer layer 59, the spin torque oscillator 60, the trailing shield 16A, and the coupling portion 42 in this order.

Figure 8:
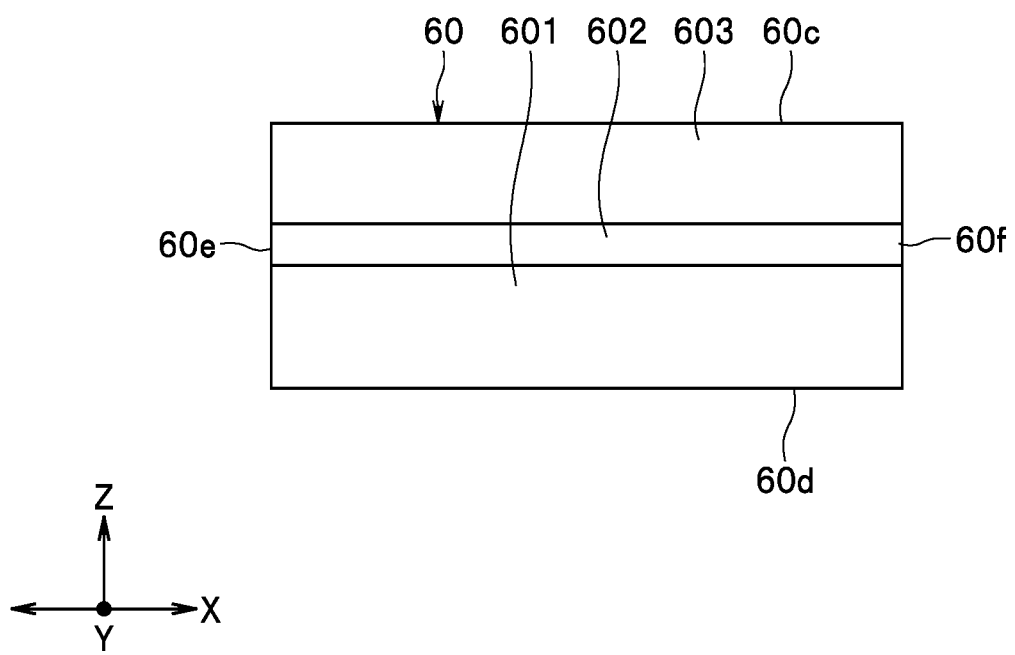
FIG. 8 is a front view showing a spin torque oscillator in the magnetic head according to the embodiment of the invention.

Reference is now made to FIG. 8 to describe a configuration of the spin torque oscillator 60. FIG. 8 is a front view showing the spin torque oscillator 60. The spin torque oscillator 60 shown in FIG. 8 is one configured to generate a microwave magnetic field. This spin torque oscillator 60 includes a magnetic-field generating layer 601, a nonmagnetic layer 602, and a spin injection layer 603 stacked in this order, from closest to farthest from the buffer layer 59.

The magnetic-field generating layer 601 is formed of a material whose magnetization direction is parallel or almost parallel to the film plane when no driving current flows. The magnetic-field generating layer 601 may be a magnetic layer formed of one of FeCo, FeCoAl, FeCoSi, FeCoB, and FeNi, a layered film composed of alternately stacked layers of FeCo and Ni, or a layered film composed of alternately stacked layers of Fe and Co.

The nonmagnetic layer 602 is formed of a material having high spin permeability. The nonmagnetic layer 602 may be a nonmagnetic metal layer formed of one of Ag, Au, Cr, and Al, or a tunnel barrier layer formed of MgO or $Al_2O_3$.

The spin injection layer 603 is formed of a material having magnetic anisotropy in a direction perpendicular to the film plane. The spin injection layer 603 may be a layered film composed of alternately stacked layers of CoFe and Ni, a layered film composed of alternately stacked layers of Co and Pt, a layered film composed of alternately stacked layers of Co and Pd, or an alloy layer formed of one of CoPt, FePt, and MnGa.

The spin torque oscillator 60 may further include a protective layer disposed on the spin injection layer 603. The protective layer is formed of a nonmagnetic metal material. For example, the protective layer is formed of one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

In the spin torque oscillator 60 shown in FIG. 8, passing a driving current in the direction from the magnetic-field generating layer 601 to the spin injection layer 603 imparts a spin torque to the magnetization of the magnetic-field generating layer 601 to cause precession of the magnetization of the magnetic-field generating layer 601. As a result, a microwave magnetic field is generated from the magnetic-field generating layer 601.

Reference is now made to FIGS. 3 and 4 to describe the connection relationship between the upper coil portion 20 and the lower coil portion 10 of the coil. As shown in FIG. 3, the lower coil portion 10 has a coil connection 10E electrically connected to the upper coil portion 20. As shown in FIG. 4, the upper coil portion 20 has a coil connection 20S electrically connected to the coil connection 10E of the lower coil portion 10. The coil connection 20S is electrically connected to the coil connection 10E via a first and a second connection layer of columnar shape (not shown) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example shown in FIGS. 3 and 4, the upper coil portion 20 and the lower coil portion 10 are connected in series.

Figure 7:
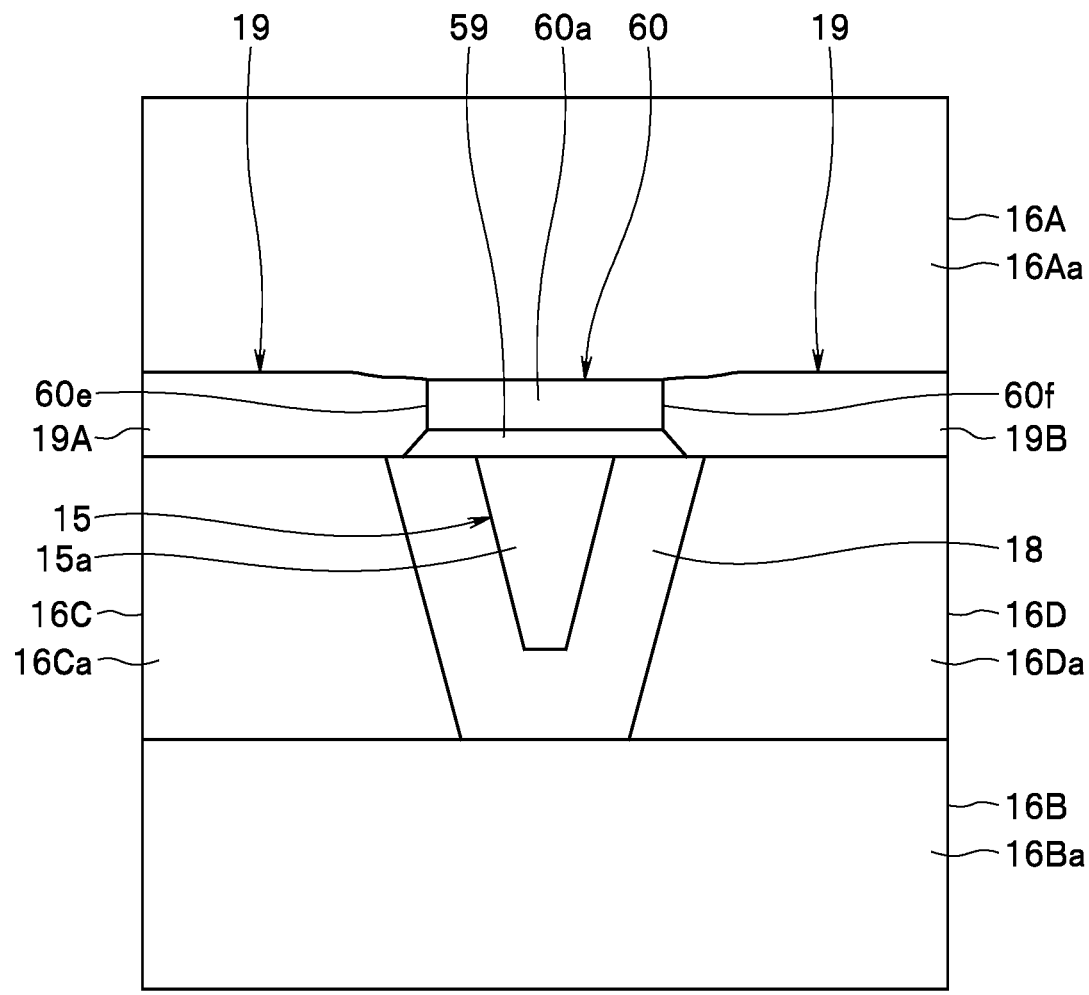
FIG. 7 is a front view showing the essential parts of the magnetic head according to the embodiment of the invention.

Now, the shape of the main pole 15 will be described in detail with reference to FIGS. 3 to 7. FIG. 5 is a perspective view showing essential parts of the magnetic head 100. FIG. 6 is a cross-sectional view showing the essential parts of the magnetic head 100. FIG. 7 is a front view showing the essential parts of the magnetic head 100.

As shown in FIGS. 3 and 4, the main pole 15 includes a track width defining portion 15A having the end face 15a and an end opposite thereto, and a wide portion 15B connected to the end of the track width defining portion 15A. The main pole 15 has the top surface 15T, the bottom end 15L, the first side surface, and the second side surface. Hereinafter, a width in the track width direction (the X direction) will be simply referred to as a width. The width of the top surface 15T is greater in the wide portion 15B than in the track width defining portion 15A. The width of the top surface 15T in the track width defining portion 15A gradually increases with increasing distance from the medium facing surface 80, and then becomes constant.

As shown in FIGS. 5 and 6, the top surface 15T includes a first inclined portion 15T1a, a second inclined portion 15T1b, a third inclined portion 15T1c, a fourth inclined portion 15T1d, and a flat portion 15T2 arranged in order of closeness to the medium facing surface 80. Each of the first to fourth inclined portions 15T1a, 15T1b, 15T1c, and 15T1d has a front end closest to the medium facing surface 80 and a rear end farthest from the medium facing surface 80. Each of the first to fourth inclined portions 15T1a, 15T1b, 15T1c, and 15T1d is inclined relative to the medium facing surface 80 and the direction perpendicular to the medium facing surface 80 (the Y direction) so that its rear end is located forward relative to its front end in the direction of travel of the recording medium 90 (the Z direction). The flat portion 15T2 extends substantially in the direction perpendicular to the medium facing surface 80 (the Y direction).

A total length of the second and third inclined portions 15T1b and 15T1c in the direction perpendicular to the medium facing surface 80 (the Y direction) is greater than or equal to the length of the first inclined portion 15T1a in the direction perpendicular to the medium facing surface 80. The distance from the medium facing surface 80 to the rear end of the first inclined portion 15T1a is in the range of 10 to 25 nm, for example. The distance from the medium facing surface 80 to the rear end of the second inclined portion 15T1b is in the range of 25 to 35 nm, for example. The distance from the medium facing surface 80 to the rear end of the third inclined portion 15T1c is in the range of 40 to 60 nm, for example.

Now, assume a first imaginary plane PL1 and a second imaginary plane PL2 as shown in FIG. 6. The first imaginary plane PL1 is a plane that includes the first inclined portion 15T1a and is inclined relative to the medium facing surface 80 and the direction perpendicular to the medium facing surface 80 (the Y direction). The second imagery plane PL2 is a plane that passes the rear end of the second inclined portion 15T1b and is parallel to the first inclined portion 15T1a. The second imaginary plane PL2 is parallel to the first imaginary plane PL1.

The distance from the rear end of the second inclined portion 15T1b to the first imaginary plane PL1 is in the range of 10 to 25 nm, for example. This distance substantially represents an increase in the thickness of the main pole 15 because of the provision of the second inclined portion 15T1b.

The distance from the rear end of the third inclined portion 15T1c to the second imaginary plane PL2 is in the range of 10 to 25 nm, for example. This distance substantially represents an increase in the thickness of the main pole 15 because of the provision of the third inclined portion 15T1c.

The angle that the second inclined portion 15T1b forms with a direction parallel to the medium facing surface 80 is greater than the angle that the first inclined portion 15T1a forms with the direction parallel to the medium facing surface 80. The angle that the third inclined portion 15T1c forms with the direction parallel to the medium facing surface 80 is greater than the angle that the second inclined portion 15T1b forms with the direction parallel to the medium facing surface 80. The angle that the fourth inclined portion 15T1d forms with the direction parallel to the medium facing surface 80 is smaller than the angle that the third inclined portion 15T1c forms with the direction parallel to the medium facing surface 80.

As shown in FIG. 6, the bottom end 15L includes a first inclined portion and a first flat portion, the first inclined portion being closer to the medium facing surface 80 than the first flat portion. The first inclined portion has a first end located in the medium facing surface 80, and a second end opposite thereto. The first inclined portion may be an edge formed by two intersecting surfaces, or may be a surface connecting two surfaces to each other. The first flat portion is a surface connected to the second end of the first inclined portion. The first inclined portion is inclined such that the second end is located backward relative to the first end in the direction of travel of the recording medium 90 (the Z direction). The first flat portion extends substantially in a direction perpendicular to the medium facing surface 80 (the Y direction).

As shown in FIG. 1, the bottom end 15L further includes a second inclined portion and a second flat portion. The second inclined portion is a surface connected to an end of the first flat portion opposite from the first inclined portion. The second flat portion is a surface connected to an end of the second inclined portion opposite from the first flat portion. The second inclined portion is inclined in a manner similar to that in which the first inclined portion is inclined. The second flat portion extends substantially in a direction perpendicular to the medium facing surface 80 (the Y direction), like the first flat portion.

As shown in FIG. 7, the end face 15a of the main pole 15 has a top edge farthest from the top surface 1a of the substrate 1, a first side edge connected to one end of the top edge, and a second side edge connected to the other end of the top edge. In the present embodiment, specifically, the top edge is in contact with the buffer layer 59. The top edge defines the track width. The position of an end of a recording bit to be recorded on the recording medium 90 is determined by the position of the top edge. The width in the track width direction of the end face 15a of the main pole 15 decreases with increasing distance from the top edge, i.e., with decreasing distance to the top surface 1a of the substrate 1. Each of the first side edge and the second side edge forms an angle in the range of, for example, 7° to 17°, preferably 10° to 15°, with respect to a direction perpendicular to the top surface 1a of the substrate 1. The top edge has a length in the range of 0.05 to 0.20 µm, for example.

Next, the shapes and positions of the spin torque oscillator 60 and the nonmagnetic layer 61 will be described in detail with reference to FIGS. 6 to 8. As shown in FIGS. 6 to 8, the spin torque oscillator 60 has a front end face 60a facing the medium facing surface 80, a rear end face 60b farthest from the medium facing surface 80, a top surface 60c farthest from the top surface 1a of the substrate 1, a bottom surface 60d closest to the top surface 1a of the substrate 1, and a first side surface 60e and a second side surface 60f opposite to each other in the track width direction (the X direction). In the present embodiment, specifically, the front end face 60a is located in the medium facing surface 80. The top surface 60c is in contact with the trailing shield 16A. The bottom surface 60d is in contact with the buffer layer 59.

The nonmagnetic layer 61 is located on the fourth inclined portion 15T1d. The buffer layer 59 and the spin torque oscillator 60 are located on the first to third inclined portions 15T1a, 15T1b, and 15T1c. The buffer layer 59 and the nonmagnetic layer 61 are interposed between the fourth inclined portion 15T1d and the spin torque oscillator 60. The nonmagnetic layer 61 has a front end closest to the medium facing surface 80. The distance from the medium facing surface 80 to the rear end face 60b of the spin torque oscillator 60 is greater than the distance from the medium facing surface 80 to the front end of the nonmagnetic layer 61. The distance from the medium facing surface 80 to the rear end face 60b of the spin torque oscillator 60 is in the range of 60 to 70 nm, for example.

Next, the operation and effects specific to the magnetic head 100 according to the present embodiment will be described. In the present embodiment, the top surface 15T of the main pole 15 includes at least the first to third inclined portions 15T1a, 15T1b, and 15T1c. According to the present embodiment, the thickness of the main pole 15 can thus be increased compared to the case where the number of inclined portions is one or two. As a result, the cross-sectional area of the main pole 15 near the medium facing surface 80 can be increased.

Moreover, in the present embodiment, the total length of the second and third inclined portions 15T1b and 15T1c in the direction perpendicular to the medium facing surface 80 is greater than or equal to the length of the first inclined portion 15T1a in the direction perpendicular to the medium facing surface 80. According to the present embodiment, the thickness of the main pole 15 can thus be increased compared to a case where the total length of the second and third inclined portions 15T1b and 15T1c is less than the length of the first inclined portion 15T1a. As a result, the cross-sectional area of the main pole 15 near the medium facing surface 80 can be increased.

In the present embodiment, the angle that the second inclined portion 15T1b forms with the direction parallel to the medium facing surface 80 is greater than the angle that the first inclined portion 15T1a forms with the direction parallel to the medium facing surface 80. According to the present embodiment, the thickness of the main pole 15 can thus be increased compared to a case where the foregoing angle of the second inclined portion 15T1b is smaller than that of the first inclined portion 15T1a. Moreover, in the present embodiment, the angle that the third inclined portion 15T1c forms with the direction parallel to the medium facing surface 80 is greater than the angle that the second inclined portion 15T1b forms with the direction parallel to the medium facing surface 80. According to the present embodiment, the thickness of the main pole 15 can thus be increased compared to a case where the foregoing angle of the third inclined portion 15T1c is smaller than that of the second inclined portion 15T1b. As a result, according to the present embodiment, the cross-sectional area of the main pole 15 near the medium facing surface 80 can be increased.

Next, a manufacturing method for the magnetic head 100 according to the present embodiment will be described. The manufacturing method for the magnetic head 100 according to the present embodiment starts with forming the insulating layer 2, the first read shield layer 3, and the MR element 5 in this order on the substrate 1, as shown in FIGS. 1 and 2. Next, the insulating layer 6 is formed around the MR element 5. The second read shield layer 7, the nonmagnetic layer 71, the middle shield layer 72, and the nonmagnetic layer 73 are then formed in this order over the MR element 5 and the insulating layer 6.

Next, the coupling portion 31 is formed on the nonmagnetic layer 73 by frame plating, for example Then, the insulating layer 51 is formed over the entire top surface of the stack. The insulating layer 51 is then polished by, for example, chemical mechanical polishing (hereinafter referred to as CMP), until the coupling portion 31 is exposed. Next, the coupling portions 32 and 33 are formed on the coupling portion 31 by frame plating, for example. The insulating film 52 is then formed over the entire top surface of the stack. Next, the lower coil portion 10 is formed by frame plating, for example. The insulating layer 53 is then formed over the entire top surface of the stack. The insulating film 52 and the insulating layer 53 are then polished by, for example. CMP, until the lower coil portion 10 and the coupling portions 32 and 33 are exposed.

Next, the coupling portion 32 and the insulating layer 53 are etched to form therein an accommodation part to accommodate the coupling portion 34. Then, the coupling portion 34 is formed to be accommodated in the accommodation part. The insulating layer 54 is then formed over the entire top surface of the stack. Next, the insulating layer 54 is selectively etched to form therein a first opening for exposing the top surface of the coupling portion 34 and a second opening for exposing the coil connection 10E (see FIG. 3) of the lower coil portion 10. Then, the leading shield 16B is formed on the coupling portion 34 at the position of the first opening, the coupling portion 35 is formed on a portion of the insulating layer 54 covering the top surface of the coupling portion 33, and a first connection layer (not shown) is formed on the coil connection 10E at the position of the second opening, by performing frame plating, for example.

Next, the nonmagnetic layer 55 is formed over the entire top surface of the stack. The nonmagnetic layer 55 is then polished by, for example, CMP, until the leading shield 16B, the coupling portion 35, and the first connection layer are exposed. Then, the leading shield 16B and the nonmagnetic layer 55 are taper-etched in part by, for example, ion beam etching (hereinafter referred to as IBE) so as to provide the top surface of the leading shield 16B with a portion to be opposed to the first inclined portion (see FIG. 6) of the bottom end 15L of the main pole 15 to be formed later, and provide the top surface of the nonmagnetic layer 55 with a portion to be opposed to the second inclined portion (see FIG. 1) of the bottom end 15L of the main pole 15 to be formed later. The coupling portion 35 and the first connection layer are also etched in part by this etching.

Next, the first and second side shields 16C and 16D are formed on the leading shield 16B by, for example, frame plating. The first gap layer 18 is then formed to cover the leading shield 16B and the first and second side shields 16C and 16D. In the case of using alumina as the material of the first gap layer 18, the first gap layer 18 is formed by atomic layer deposition (herein after referred to as ALD), for example.

Reference is now made to FIGS. 9A to 17B to describe a series of steps to be performed after the foregoing step up to the formation of the trailing shield 16A. FIGS. 9A to 17B each show a stack of layers formed in the process of manufacturing the magnetic head 100. FIG. nA (n is an integer between 9 and 17 inclusive) shows a cross section of the stack taken at the location at which the medium facing surface 80 is to be formed. FIG. nB shows a cross section that intersects the end face 15a of the main pole 15 and that is perpendicular to the medium facing surface 80 and to the top surface 1a of the substrate 1. In FIG. nB, the symbol "ABS" indicates the location at which the medium facing surface 80 is to be formed. FIG. nA and FIG. nB omit the showing of portions located below the leading shield 16B.

Figure 9A:
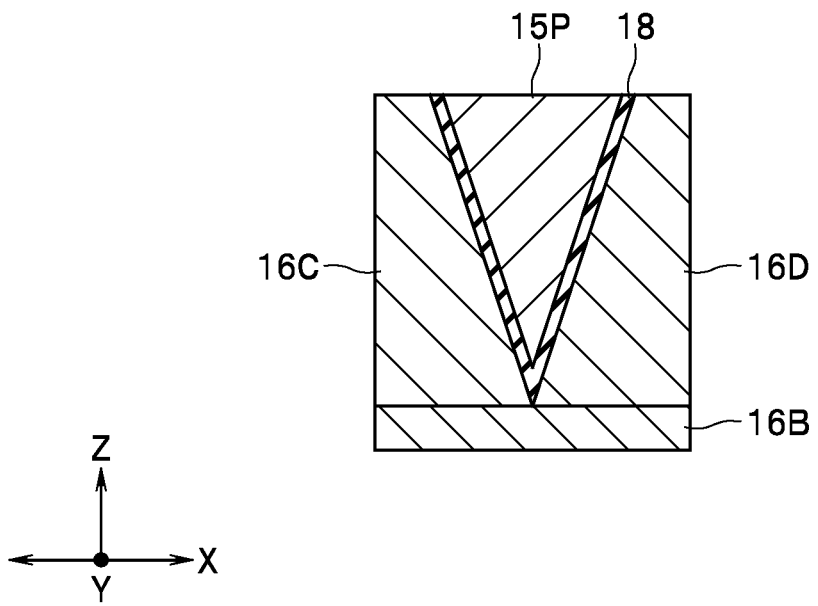
FIGS. 9A and 9B are cross-sectional views showing a step of a manufacturing method for the magnetic head according to the embodiment of the invention.
Figure 9B:
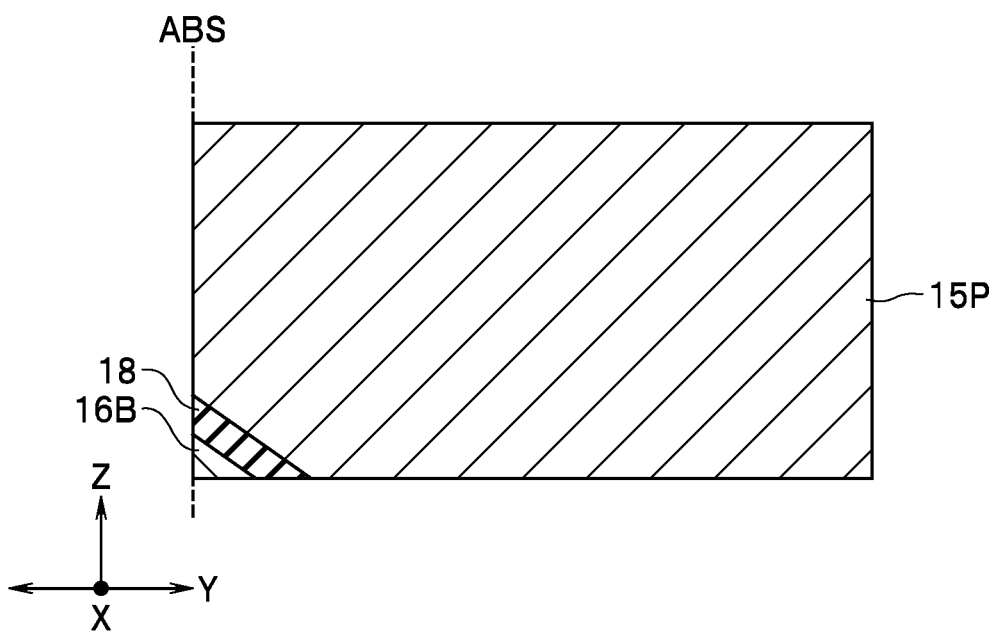

FIGS. 9A and 9B show the step after the formation of the first gap layer 18. In this step, an opening for exposing the top surface of the coupling portion 35 and an opening for exposing the top surface of the first connection layer are initially formed in the first gap layer 18 by selectively etching the first gap layer 18. Next, an initial main pole 15P, which becomes the main pole 15 later, and the second connection layer (not shown) are formed by frame plating, for example. The initial main pole 15P and the second connection layer are formed such that their top surfaces are higher in level than portions of the first gap layer 18 that are located on the first and second side shields 16C and 16D. Next, the first nonmagnetic layer (not shown) is formed over the entire top surface of the stack. The initial main pole 15P, the second connection layer, the first gap layer 18, and the first nonmagnetic layer are then polished by, for example, CMP until the first and second side shields 16C and 16D are exposed.

Figure 10A:
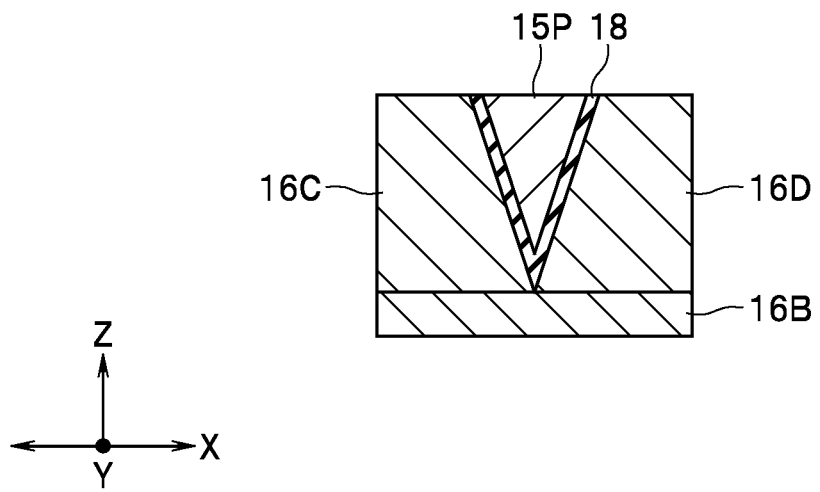
FIGS. 10A and 10B are cross-sectional views showing a step that follows the step shown in FIGS. 9A and 9B.
Figure 10B:
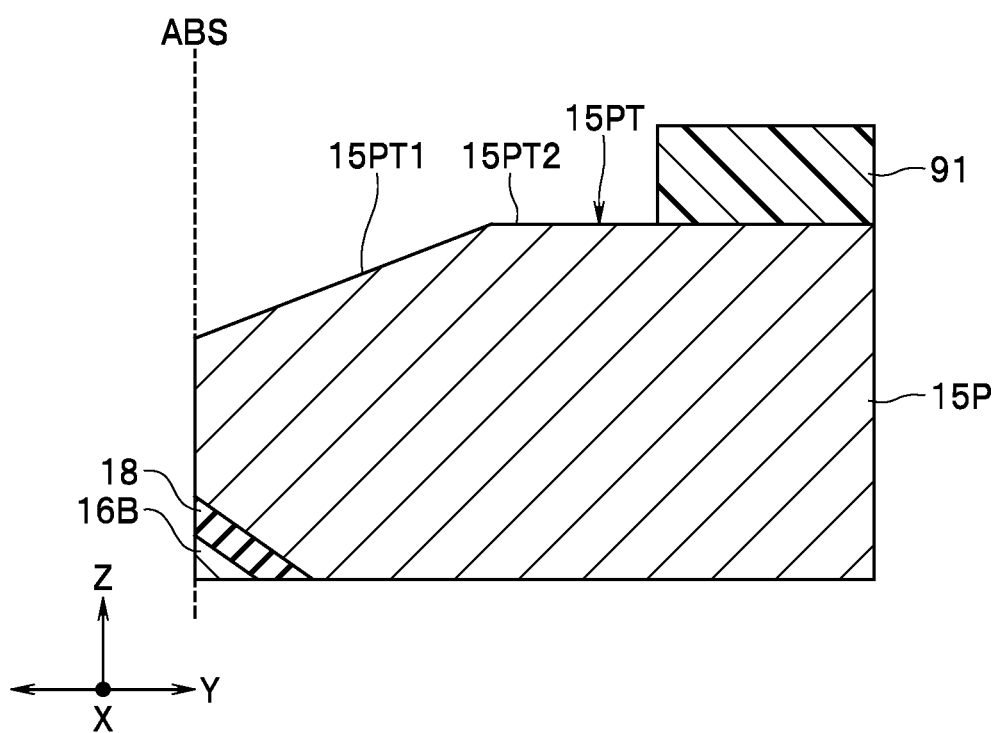

FIGS. 10A and 10B show the next step. In this step, a mask 91 is initially formed on the initial main pole 15P. The mask 91 does not cover a part of the top surface 15PT of the initial main pole 15P at or near a position ABS where the medium facing surface 80 is to be formed. Next, the initial main pole 15P is taper-etched by IBE, for example. The first and second side shields 16C and 16D, the first gap layer 18, and the first nonmagnetic layer are also etched in part by this etching. The top surface 15PT of the etched initial main pole 15P includes an inclined portion 15PT1 and a flat portion 15PT2 arranged in order of closeness to the position ABS where the medium facing surface 80 is to be formed. The mask 91 is then removed.

Figure 11A:
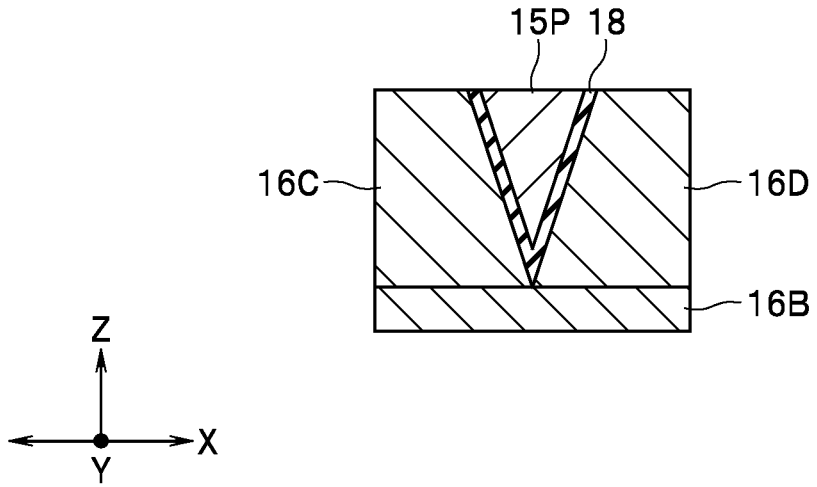
FIGS. 11A and 11B are cross-sectional views showing a step that follows the step shown in FIGS. 10A and 10B.
Figure 11B:
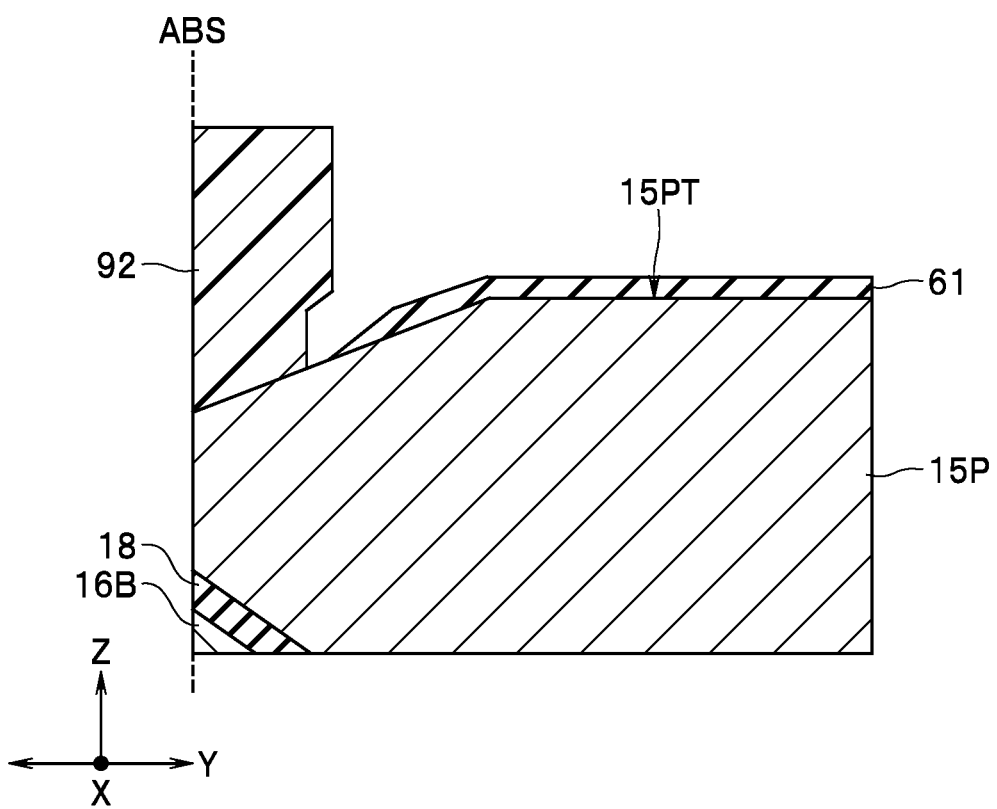

FIGS. 11A and 11B show the next step. In this step, a mask 92 is initially formed to cover a part of the top surface 15PT of the initial main pole 15P at and near the position ABS where the medium facing surface 80 is to be formed. The nonmagnetic layer 61 is then formed over the entire top surface of the stack. The mask 92 is then lifted off.

Figure 12A:
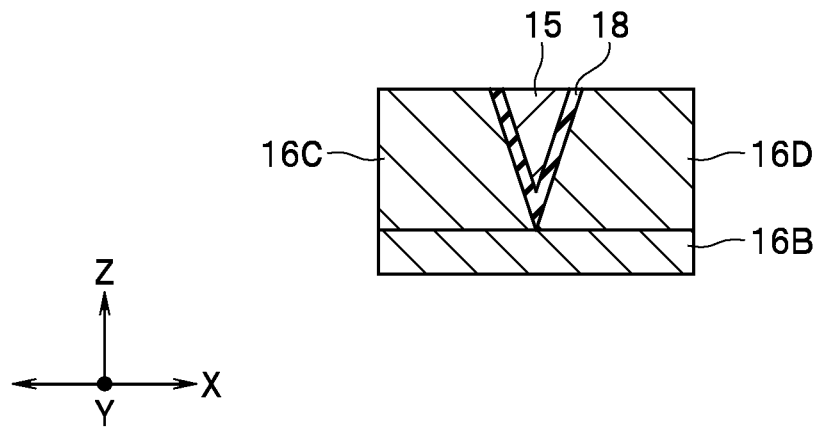
FIGS. 12A and 12B are cross-sectional views showing a step that follows the step shown in FIGS. 11A and 11B.
Figure 12B:
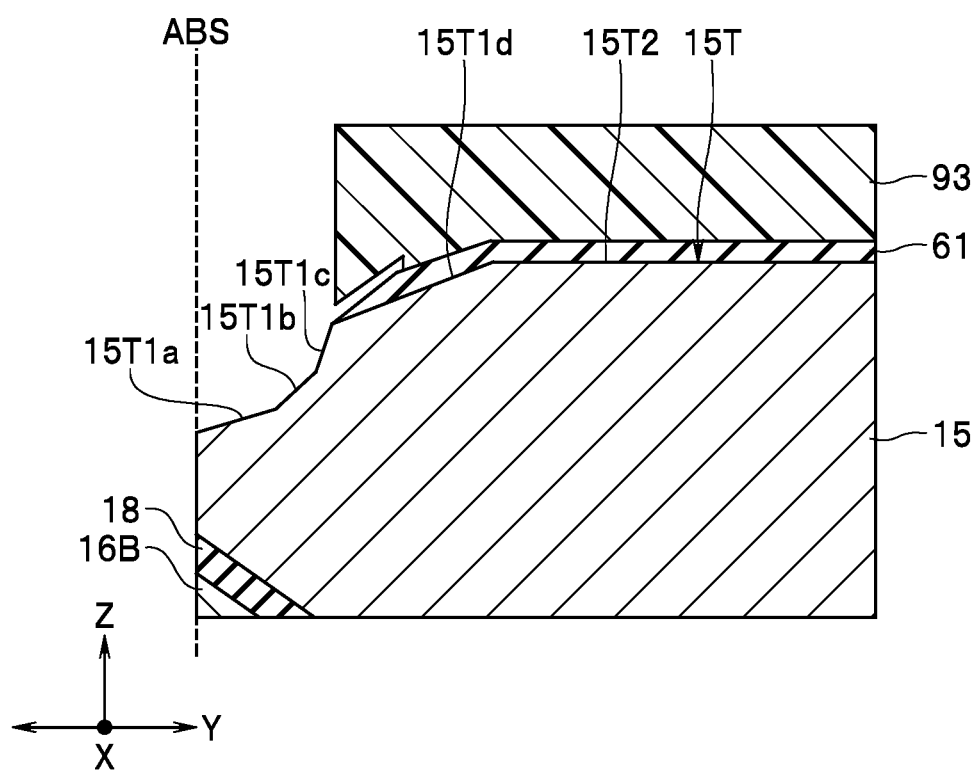

FIGS. 12A and 12B show the next step. In this step, a mask 93 is initially formed on the nonmagnetic layer 61. The mask 93 does not cover a part of the inclined portion 15PT1 (see FIG. 10B) of the top surface 15PT of the initial main pole 15P at or near the position ABS where the medium facing surface 80 is to be formed. Next, the inclined portion 15PT1 of the top surface 15PT of the initial main pole 15P is etched by IBE, for example. This forms the first to third inclined portions 15T1a, 15T1b, and 15T1c in the top surface 15PT of the initial main pole 15P, and the initial main pole 15P becomes the main pole 15. The part of the inclined portion 15PT1 of the top surface 15PT of the initial main pole 15P covered by the nonmagnetic layer 61 becomes the fourth inclined portion 15T1d. The flat portion 15PT2 of the top surface 15PT of the initial main pole 15P becomes the flat portion 15T2. The first and second side shields 16C and 16D, the first gap layer 18, and the first nonmagnetic layer are also etched in part by this etching. Next, the mask 93 is removed.

Figure 13A:
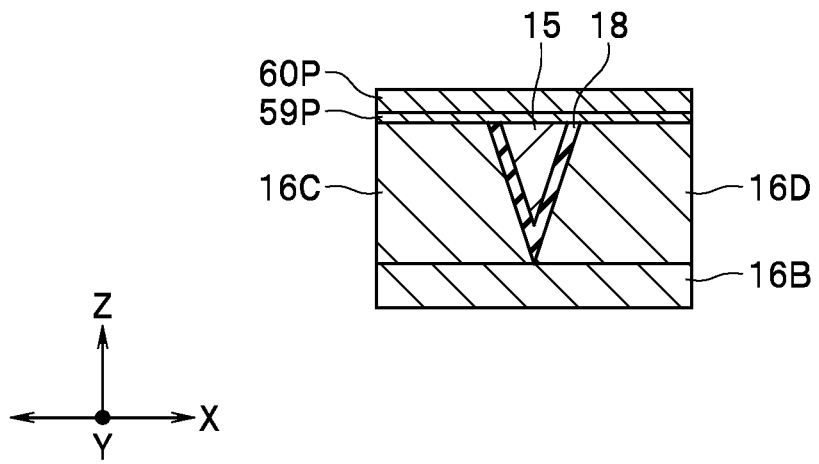
FIGS. 13A and 13B are cross-sectional views showing a step that follows the step shown in FIGS. 12A and 12B.
Figure 13B:
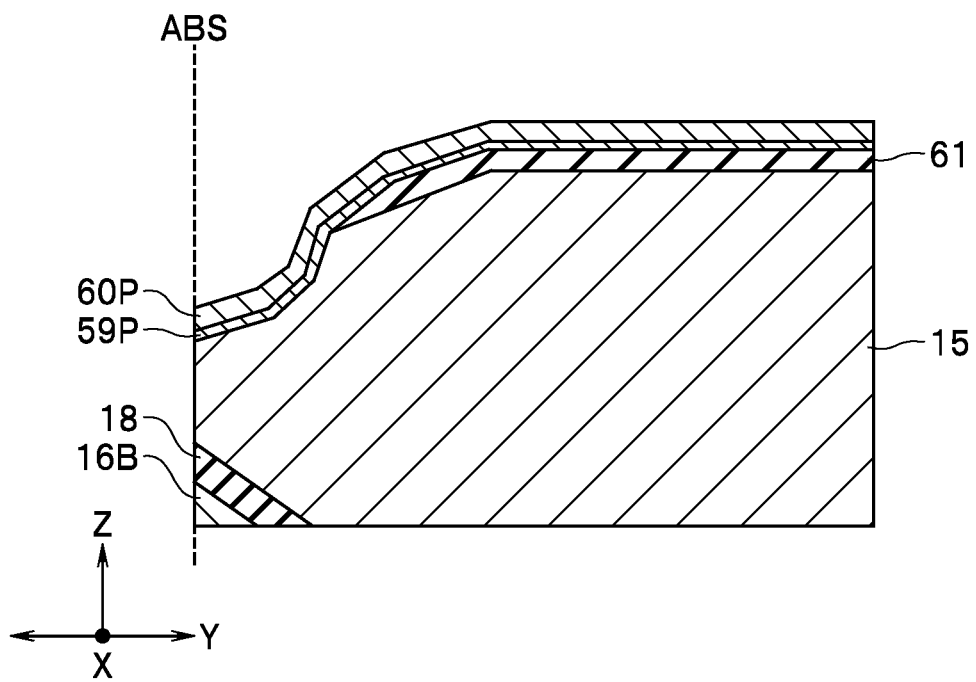

FIGS. 13A and 13B show the next step. In this step, a nonmagnetic metal film 59P, which later becomes the buffer layer 59, is initially formed on the stack. A layered film 60P, which later becomes the spin torque oscillator 60, is then formed on the nonmagnetic metal film 59P. As in the example shown in FIG. 8, the spin torque oscillator 60 is composed of a plurality of layers. The layered film 60P includes all the layers to constitute the spin torque oscillator 60.

Figure 14A:
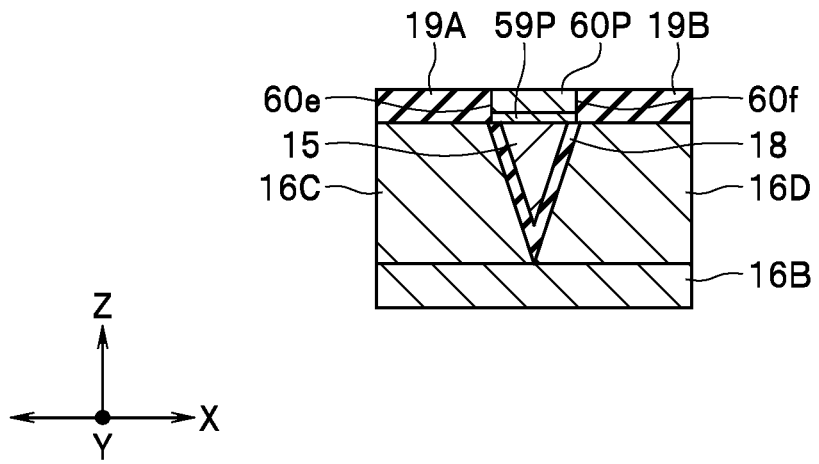
FIGS. 14A and 14B are cross-sectional views showing a step that follows the step shown in FIGS. 13A and 13B.
Figure 14B:
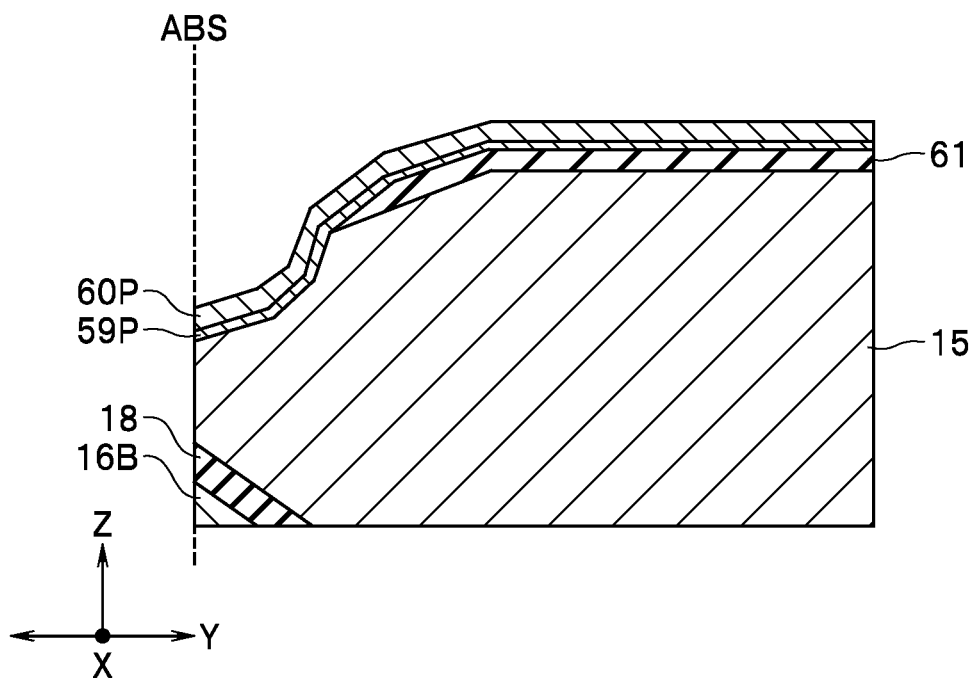

FIGS. 14A and 14B show the next step. In this step, both the layered film 60P and the nonmagnetic metal film 59P are initially etched in part so that the first and second side surfaces 60e and 60f of the spin torque oscillator 60 are formed in the layered film 60P. The first portion 19A and the second portion 19B of the second gap layer 19 are then formed on the first gap layer 18 and the first and second side shields 16C and 16D.

Figure 15A:
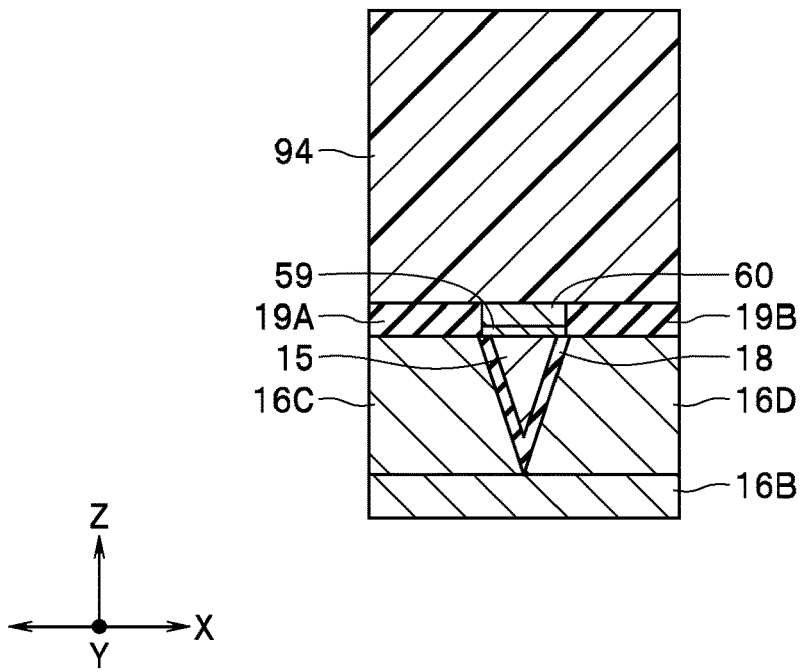
FIGS. 15A and 15B are cross-sectional views showing a step that follows the step shown in FIGS. 14A and 14B.
Figure 15B:
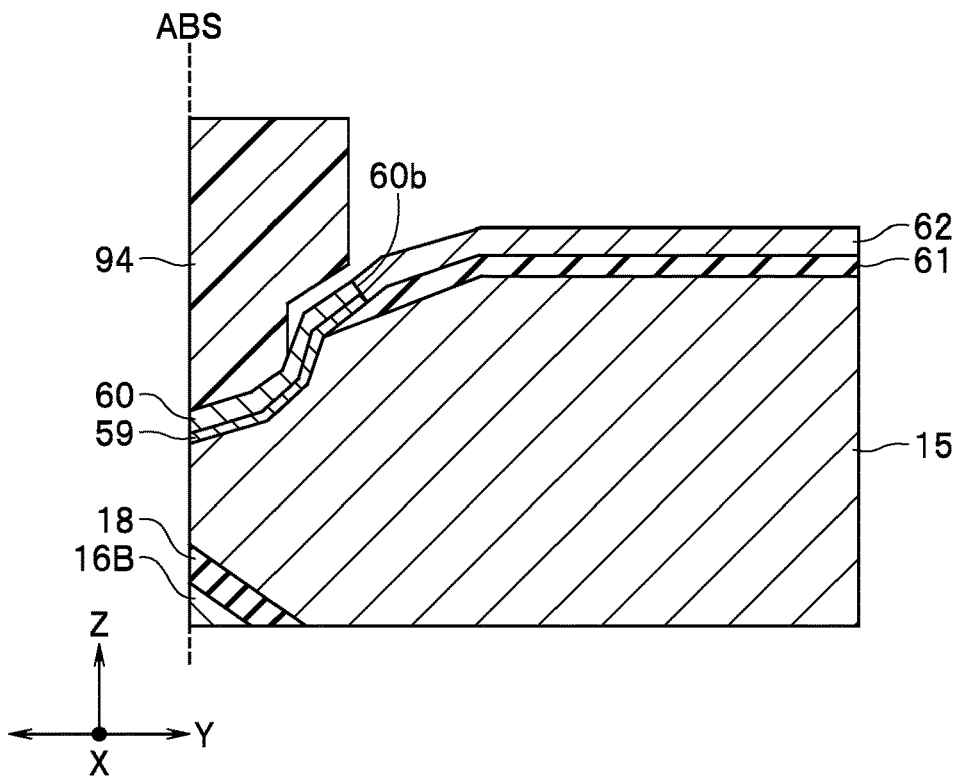

FIGS. 15A and 15B show the next step. In this step, a mask 94 is initially formed to cover a part of the top surface of the layered film 60P at and near the position ABS where the medium facing surface 80 is to be formed. The layered film 60P is then etched by IBE so that the rear end face 60b of the spin torque oscillator 60 is formed in the layered film 60P. This makes the layered film 60P into the spin torque oscillator 60. The nonmagnetic metal film 59P is etched continuously after the etching of the layered film 60P, until the nonmagnetic layer 61 is exposed. This makes the nonmagnetic metal layer 59P into the buffer layer 59. The heat sink 62 is then formed over the entire top surface of the stack with the mask 94 left unremoved. The mask 94 is then lifted off. In the step shown in FIGS. 15A and 15B, the heat sink 62 may be patterned after the liftoff of the mask 94.

In the present embodiment, the distance from the medium facing surface 80 (or position ABS) to the rear end face 60b of the spin torque oscillator 60 is greater than the distance from the medium facing surface 80 (or position ABS) to the front end of the nonmagnetic layer 61. In the step of etching the nonmagnetic metal film 59P and the layered film 60P, the top surface 15T of the main pole 15 is thus protected by the nonmagnetic layer 61. According to the present embodiment, the cross-sectional area of the main pole 15 near the medium facing surface 80 can thereby be prevented from decreasing.

Figure 16A:
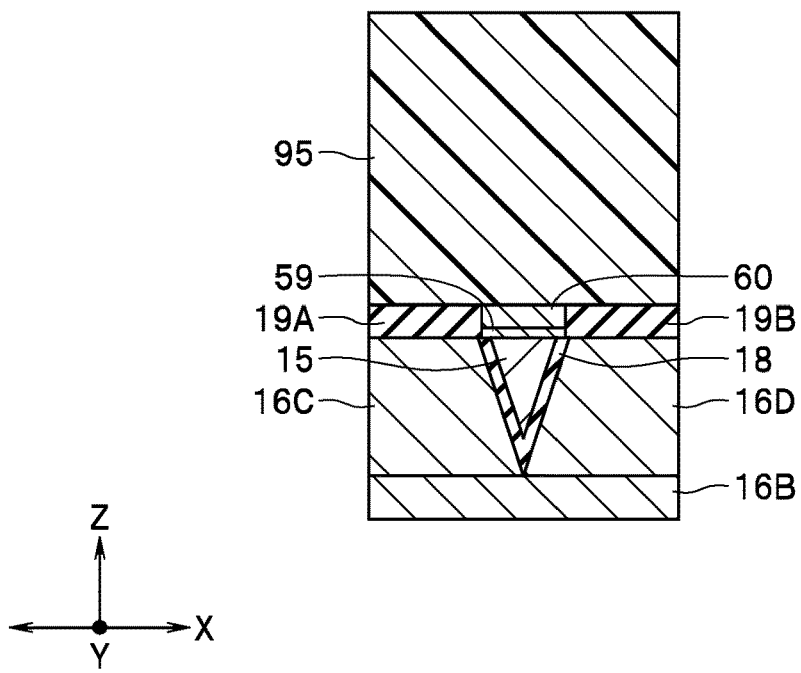
FIGS. 16A and 16B are cross-sectional views showing a step that follows the step shown in FIGS. 15A and 15B.
Figure 16B:
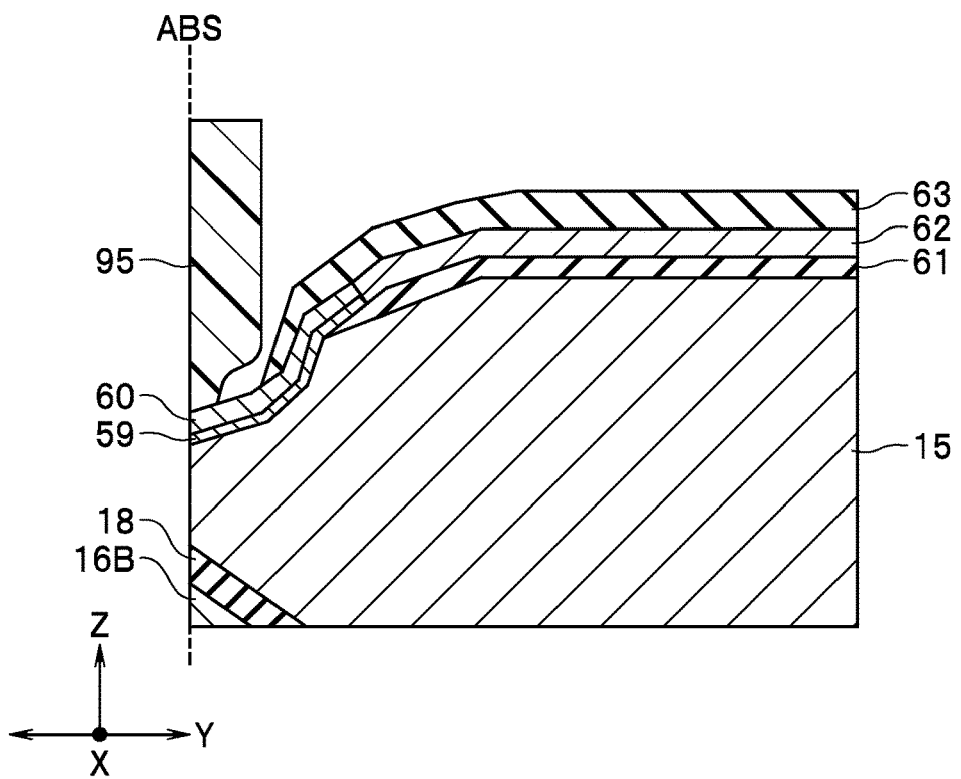

FIGS. 16A and 16B show the next step. In this step, a mask 95 is initially formed to cover a part of the top surface of the stack at and near the position ABS where the medium facing surface 80 is to be formed. The insulating layer 63 is then formed over the entire top surface of the stack. The mask 95 is then lifted off.

Figure 17A:
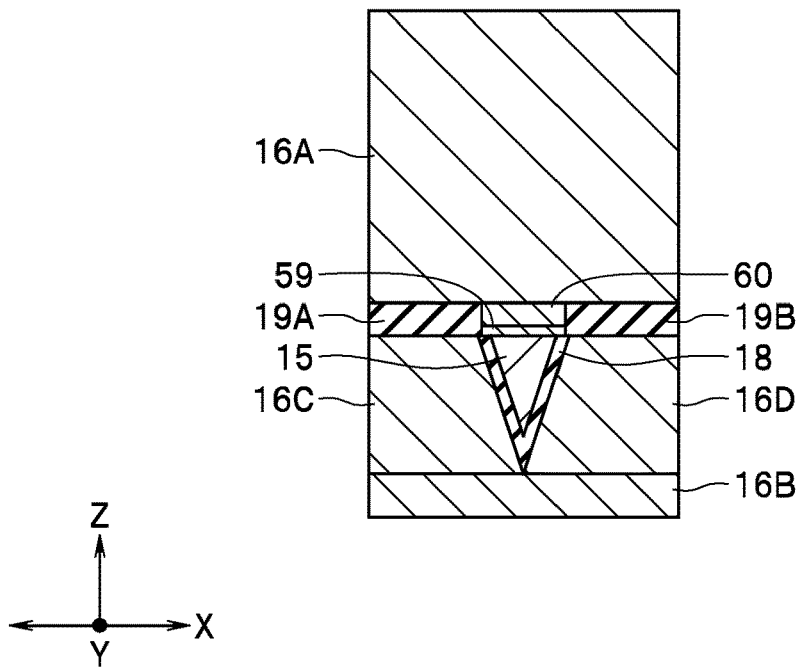
FIGS. 17A and 17B are cross-sectional views showing a step that follows the step shown in FIGS. 16A and 16B.
Figure 17B:
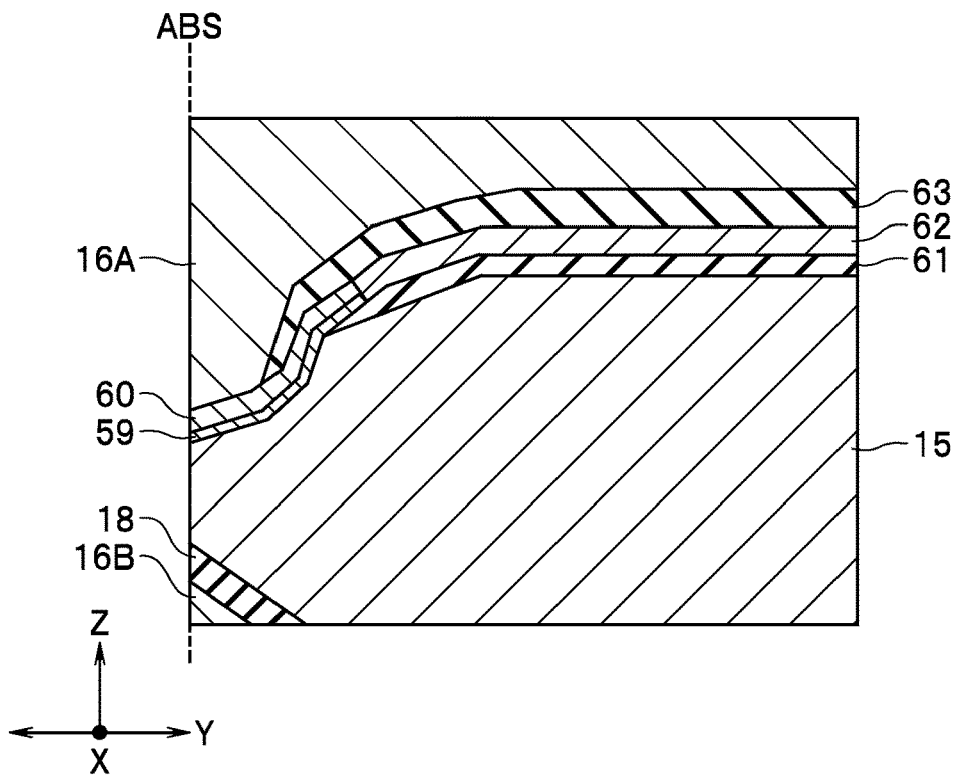

FIGS. 17A and 17B show the next step. In this step, the second gap layer 19 is initially selectively etched to expose a part of the top surfaces of the first and second side shields 16C and 16D by IBE, for example. The nonmagnetic layer 61 and the insulating layer 63 are then selectively etched to expose the second portion of the top surface 15T of the main pole 15 by IBE, for example. Next, for example, by frame plating, the trailing shield 16A is formed on the first and second side shields 16C and 16D, the second gap layer 19, the spin torque oscillator 60, and the insulating layer 63, and the coupling portion 41 is formed on the main pole 15.

Steps following the formation of the trailing shield 16A will be described below with reference to FIG. 1 and FIG. 2. First, the insulating film 65 is formed over the entire top surface of the stack. The insulating film 65 is then selectively etched to form therein an opening for exposing the top surface of the second connection layer. Next, the upper coil portion 20 is formed by frame plating, for example The second nonmagnetic layer (not shown) is then formed over the entire top surface of the stack. The insulating film 65 and the second nonmagnetic layer are then polished by, for example, CMP, until the trailing shield 16A, the upper coil portion 20, and the coupling portion 41 are exposed.

Next, the insulating layer 66 is formed over the entire top surface of the stack. Then, the insulating layer 66 is selectively etched to form therein an opening for exposing the top surface of the trailing shield 16A, and the top surface of a portion of the insulating layer 66 covering the top surface of the coupling portion 41 is also etched. The coupling portion 42 is then formed by frame plating, for example. Next, the protective layer 70 is formed over the entire top surface of the stack. For example, the step of forming the wirings 83 and 84 is performed simultaneously with a series of steps from the step of forming the main pole 15 to the step of forming the protective layer 70.

Next, wiring and a plurality of terminals including the terminals 81 and 82 are formed on the protective layer 70, and the substrate 1 is cut near the position ABS where the medium facing surface 80 is to be formed. The cut surface is then polished into the medium facing surface 80, and further processes such as fabrication of flying rails are performed to complete the magnetic head 100.

The present invention is not limited to the foregoing embodiment, and various modifications may be made thereto. The shape of the main pole 15 is not limited to the example described in the embodiment and may be optional as long as the requirements set forth in the claims are satisfied.

An insulating layer formed of an insulating material such as alumina may be provided instead of the heat sink 62.

Obviously, many modifications and variations of the present invention are possible in the light of the above teachings. Thus, it is to be understood that, within the scope of the appended claims and equivalents thereof, the invention may be practiced in other than the foregoing most preferable embodiment.

What is claimed is:

1. A magnetic head comprising:
    a medium facing surface configured to face a recording medium;
    a main pole configured to generate a write magnetic field for writing data on the recording medium;
    a trailing shield formed of a magnetic material and located forward relative to the main pole in a direction of travel of the recording medium; and
    a spin torque oscillator located between the main pole and the trailing shield, and electrically connected to the main pole and the trailing shield, wherein
    the main pole has a top surface facing the trailing shield,
    the top surface of the main pole includes a first inclined portion, a second inclined portion, and a third inclined portion arranged in order of closeness to the medium facing surface,
    each of the first to third inclined portions has a front end closest to the medium facing surface and a rear end farthest from the medium facing surface, and is inclined relative to the medium facing surface and a direction perpendicular to the medium facing surface so that the rear end is located forward relative to the front end in the direction of travel of the recording medium,
    an angle that the second inclined portion forms with a direction parallel to the medium facing surface is greater than an angle that the first inclined portion forms with the direction parallel to the medium facing surface, and
    an angle that the third inclined portion forms with the direction parallel to the medium facing surface is greater than the angle that the second inclined portion forms with the direction parallel to the medium facing surface.

2. The magnetic head according to claim 1, wherein a total length of the second and third inclined portions in the direction perpendicular to the medium facing surface is greater than or equal to a length of the first inclined portion in the direction perpendicular to the medium facing surface.

3. The magnetic head according to claim 1, wherein a distance from the medium facing surface to the rear end of the first inclined portion is in a range of 10 to 25 nm.

4. The magnetic head according to claim 1, wherein a distance from the medium facing surface to the rear end of the second inclined portion is in a range of 25 to 35 nm.

5. The magnetic head according to claim 1, wherein a distance from the medium facing surface to the rear end of the third inclined portion is in a range of 40 to 60 nm.

6. The magnetic head according to claim 1, wherein a distance from the rear end of the second inclined portion to a first imaginary plane is in a range of 10 to 25 nm, and the first imaginary plane is a plane including the first inclined portion.

7. The magnetic head according to claim 1, wherein a distance from the rear end of the third inclined portion to a second imaginary plane is in a range of 10 to 35 nm, and the second imaginary plane is a plane that passes through the rear end of the second inclined portion and is parallel to the first inclined portion.

8. The magnetic head according to claim 1, wherein the top surface of the main pole further includes a fourth inclined portion which is connected to the rear end of the third inclined portion and inclined relative to the medium facing surface and the direction perpendicular to the medium facing surface.

9. The magnetic head according to claim 8, wherein an angle that the fourth inclined portion forms with the direction parallel to the medium facing surface is smaller than an angle that the third inclined portion forms with the direction parallel to the medium facing surface.

10. The magnetic head according to claim 8, further comprising a nonmagnetic layer located on the fourth inclined portion, wherein the spin torque oscillator is located on the first to third inclined portions and the nonmagnetic layer.

\* \* \* \* \*